(12) United States Patent
Komori et al.

(10) Patent No.: US 7,611,764 B2
(45) Date of Patent: Nov. 3, 2009

(54) HONEYCOMB STRUCTURE

(75) Inventors: Teruo Komori, Gifu (JP); Kazushige Ohno, Gifu (JP); Sungtae Hong, Gifu (JP); Hiroki Sato, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 212 days.

(21) Appl. No.: 10/530,561

(22) PCT Filed: Jun. 23, 2004

(86) PCT No.: PCT/JP2004/009225

§ 371 (c)(1),
(2), (4) Date: Apr. 7, 2005

(87) PCT Pub. No.: WO2004/113252

PCT Pub. Date: Dec. 29, 2004

(65) Prior Publication Data

US 2006/0068159 A1 Mar. 30, 2006

(30) Foreign Application Priority Data

Jun. 23, 2003 (JP) .............................. 2003-178797

(51) Int. Cl.
| | |
|---|---|
| B32B 3/12 | (2006.01) |
| B32B 7/00 | (2006.01) |
| B32B 3/20 | (2006.01) |
| B01D 39/06 | (2006.01) |
| B01D 59/50 | (2006.01) |
| B29C 65/00 | (2006.01) |
| C03B 29/00 | (2006.01) |
| B29C 47/00 | (2006.01) |

(52) U.S. Cl. .................. 428/116; 428/117; 428/119; 428/188; 55/523; 55/483; 55/502

(58) Field of Classification Search ................ 428/116, 428/117, 119, 188; 55/523, 483, 502; 156/60, 156/89.11; 264/177.12
See application file for complete search history.

(56) References Cited

U.S. PATENT DOCUMENTS 5,914,187 A 6/1999 Naruse et al.

(Continued)

FOREIGN PATENT DOCUMENTS

EP 0 089 751 A1 9/1983

(Continued)

OTHER PUBLICATIONS

Derwent Publications, AN 2003-171142, XP-002366975, JP 2003-001029, Jan. 7, 2003.

*Primary Examiner*—Timothy M Speer
*Assistant Examiner*—Gordon R Baldwin
(74) *Attorney, Agent, or Firm*—Oblon, Spivak, McClelland, Maier & Neustadt, L.L.P.

(57) ABSTRACT

It is to provide a honeycomb structural body having an excellent durability, which is large in the catching amount of particulates per unit volume and does not cause uneven accumulation of ash and occurrence of cracks or the like even in use for a long period of time, and there is proposed a honeycomb structural body obtained by assembling one or plural porous ceramic members in which two kinds of through-holes consisting of a group of large volume through-holes and a group of small volume through-holes are arranged side by side in the longitudinal direction through partitions and either one ends of these through-holes are plugged, wherein the ceramic member is made of silicon-ceramic composite material consisting of ceramic and silicon.

21 Claims, 15 Drawing Sheets

U.S. PATENT DOCUMENTS

| | | | |
|---|---|---|---|
| 5,930,994 A | 8/1999 | Shimato et al. | |
| 6,447,564 B1 | 9/2002 | Ohno et al. | |
| 6,565,630 B2 | 5/2003 | Ohno et al. | |
| 6,669,751 B1 * | 12/2003 | Ohno et al. | 55/523 |
| 6,770,116 B2 | 8/2004 | Kojima | |
| 7,056,568 B2 * | 6/2006 | Ichikawa et al. | 428/116 |
| 2003/0021948 A1 | 1/2003 | Ichikawa et al. | |
| 2004/0031264 A1 | 2/2004 | Kojima | |
| 2004/0033175 A1 | 2/2004 | Ohno et al. | |
| 2004/0055265 A1 | 3/2004 | Ohno et al. | |
| 2004/0161596 A1 | 8/2004 | Taoka et al. | |
| 2004/0223892 A1 | 11/2004 | Kojima | |
| 2005/0011174 A1 | 1/2005 | Hong et al. | |
| 2005/0016140 A1 | 1/2005 | Komori et al. | |
| 2005/0016141 A1 | 1/2005 | Hong et al. | |
| 2005/0076626 A1 | 4/2005 | Kudo et al. | |
| 2006/0217262 A1 | 9/2006 | Yoshida | |
| 2006/0288678 A1 | 12/2006 | Yoshida | |

FOREIGN PATENT DOCUMENTS

| | | |
|---|---|---|
| EP | 1 277 714 A1 | 1/2003 |
| EP | 1 502 639 AL | 2/2005 |
| JP | 58-92409 | 6/1983 |
| JP | 58-196820 | 11/1983 |
| JP | 62-234552 | 10/1987 |
| JP | 62-283871 | 12/1987 |
| JP | 5-68828 | 3/1993 |
| JP | 3130587 | 11/2000 |
| JP | 2001-229935 | 8/2001 |
| JP | 2001-334114 * | 12/2001 |
| JP | 2002-326034 | 11/2002 |
| JP | 2003-1029 | 1/2003 |
| JP | 2003-155908 | 5/2003 |
| WO | WO 03-080218 A1 | 10/2003 |
| WO | 2005/037406 | 4/2005 |
| WO | WO 2005/037405 A1 | 4/2005 |
| WO | 2005/044422 | 5/2005 |
| WO | 2005/044425 | 5/2005 |
| WO | 2005/047210 | 5/2005 |
| WO | WO 2005/063653 A1 | 7/2005 |
| WO | WO 2005/068397 A1 | 7/2005 |
| WO | WO 2005/099865 A1 | 10/2005 |
| WO | WO 2005/108328 A1 | 11/2005 |
| WO | WO 2005/110578 A1 | 11/2005 |

* cited by examiner

Section at A-A line

Section at B-B line

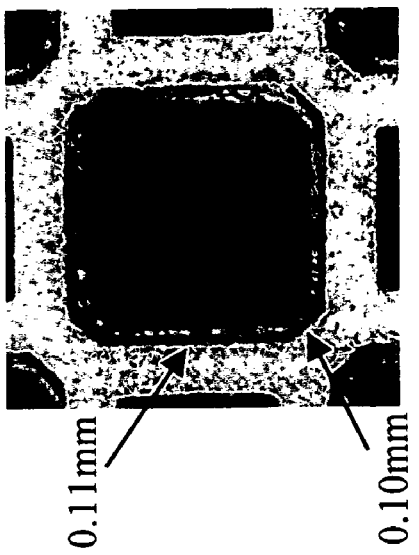
Fig. 6(c) 125mm from inlet
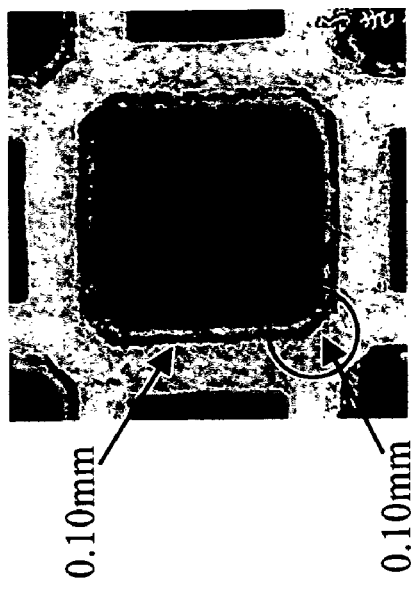
Fig. 6(b) 75mm from inlet
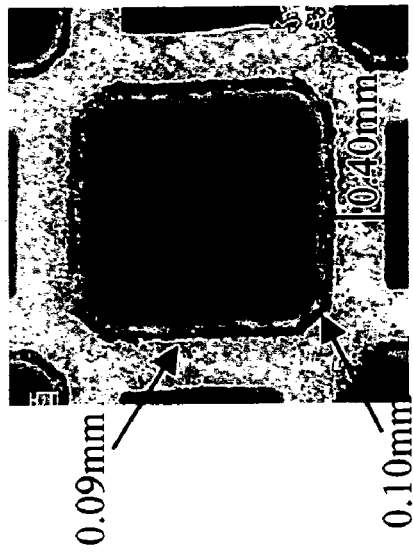
Fig. 6(a) 15mm from inlet Section at C-C line Fig.16
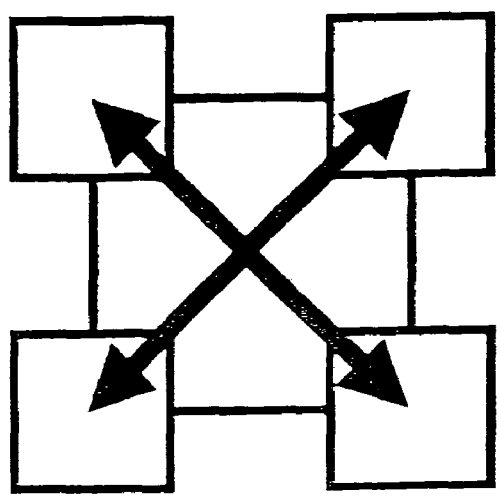
(a)
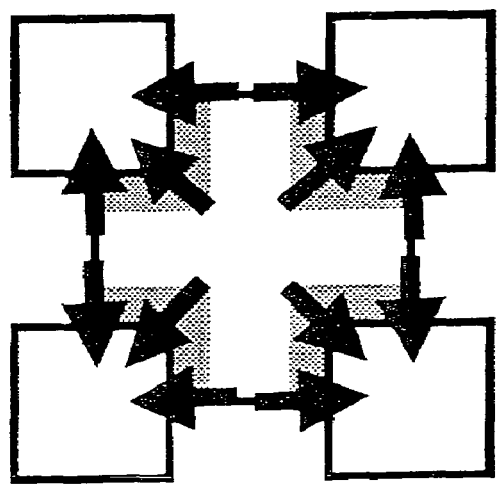
(b)
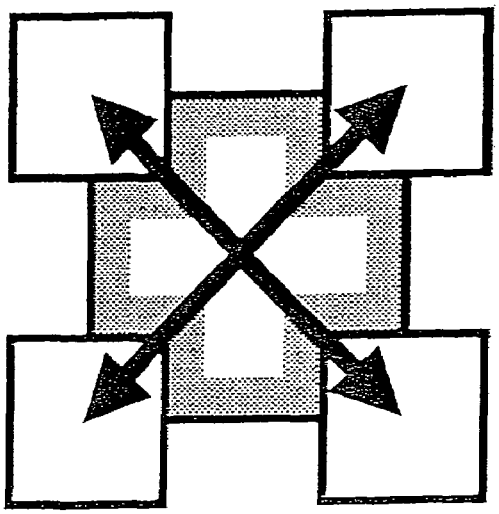
(c)

HONEYCOMB STRUCTURE

INDICATION OF THE RELATED APPLICATION

The present application is an application claiming priority of JP 2003-178797 filed on Jun. 23, 2003.

TECHNICAL FIELD

This invention relates to a honeycomb structural body used as a filter for removing particulates and the like in an exhaust gas of a vehicle discharged from internal combustion engines such as diesel engine and the like, or a catalyst carrier or the like.

BACKGROUND ART

It has been known that an exhaust gas discharged from an internal combustion engine of a vehicle such as buses, trucks or the like or a construction vehicle contains particulates having a harmful effect on environment and the human body, and techniques for removing the particulates are required. As one of such techniques, there is, for example, a honeycomb structural body (filter) for the exhaust gas purification in which the exhaust gas is passed through a porous ceramic member to catch and remove the particulates.

As a concrete embodiment of the ceramic honeycomb structural body, as shown in FIG. 10, there can be mentioned a ceramic honeycomb filter 120 obtained by combining a plurality of pillar-shaped porous ceramic members (units) 130 through sealing material layers 124 to form a ceramic block 125 and forming a sealing material layer 123 for preventing leakage of exhaust gas around the ceramic block 125.

As shown in FIG. 11(a), the honeycomb filter 120 may be made by bundling a plurality of pillar-shaped porous ceramic members 130 as a constructional unit (unit). The porous ceramic member 130 develops function as a filter by catching and removing particulates through partitions 133 when the exhaust gas passes through the partitions separating a plurality of through-holes 131 arranged side by side in the longitudinal direction.

The through-holes 131 formed in the porous ceramic member 130 have such a structure that as shown in FIG. 11(b), either one of the end portions at inlet side or outlet side of the exhaust gas is plugged with a plugging material 132 (preferably a checkered pattern) in which the exhaust gas flowed from one end portion of the opened through-hole (cell) 131a passes through the partitions 133 separating this through-holes 131a and flows into the adjacent through-hole (cell) 131b to discharge from the other end portion.

Moreover, the sealing material layer 123 arranged on the outer circumference is arranged for the purpose of preventing the leakage of the exhaust gas from the outer peripheral portion of the ceramic block 125 when the honeycomb filter 120 is placed in the exhaust passage of the internal combustion engine as mentioned above.

Such a ceramic honeycomb filter 120 is used for large-sized vehicles, diesel engine mounted vehicles and the like at present because the heat resistance is excellent and the regeneration treatment is easy. When the honeycomb filter 120 is placed in the exhaust passage of the internal combustion engine, if particulates in the exhaust gas discharged from the internal combustion engine pass through the honeycomb filter 120, they are caught by the partitions 133 (wall flow type) to attain the purification of the exhaust gas.

As this type of the exhaust gas filter, there has hitherto been proposed a filter constituted with at least two kinds of through-hole groups composed of a large volume through-hole group being relatively large in a total area of a section perpendicular to the longitudinal direction and a small volume through-hole group being relatively small in the total area of the section in which a time requiring the regeneration is prolonged by flowing the exhaust gas from the large volume through-hole group to the small volume through-hole group.

These large volume through-holes and small volume through-holes may be produced by changing an area ratio of plugging materials viewed from the cross-sectional direction when the volumes of the through-holes are equal, or by changing the volumes of the through-holes to more than two kinds and further changing the area ratio viewed from the sectional direction perpendicular to the longitudinal direction, that is, pore size of cell (area of section), or by forming two kinds of through-holes having different volumes, which are a through-hole having a large volume (large volume through-hole) and a through-hole having a small volume (small volume through-hole).

As the exhaust gas filter having such through-hole structure, there is an exhaust gas filter for a diesel engine produced by using dust metal, glass, ceramic, resin, organic polymer, paper, woven cloth, glass-ceramic mixture, thermet or the like, and particularly using cordierite as described in, for example, JP-A-3-49608.

FIG. 12 schematically shows a section of the above exhaust gas filter for diesel engine perpendicular to the longitudinal direction. This exhaust gas filter 160 has such a sectional shape that squares smaller than a regular tetragon constituting checkers are arranged at intersections of the checkers, and comprises small-volume through-holes 161b corresponding to the small squares and large-volume through-holes 161a existing therearound in which partitions 162a and 162b are formed among these through-holes.

Also, a microfilm (page 4, FIG. 6) of Japanese Utility Model Application No. 56-187890 discloses an exhaust gas filter consisting of cordierite produced by compounding silica, alumina and magnesia and rendering a cell pitch of a through-hole at the inflow side into substantially 1.0-2.5 mm.

FIG. 13 is a cross section view schematically showing a section of the above exhaust gas filter 200 perpendicular to its longitudinal direction (hereinafter referred to as "section" simply). In this exhaust gas filter 200, the sectional form is a combination of small volume through-holes 202 having a triangular shape in section around the circumference of a large volume through-hole 201 having a hexagonal shape in section.

Further, Japanese Patent No. 3130587 (page 1) discloses an exhaust gas filter made of silicon carbide in which a volume ratio of large volume through-holes is 60-70% and a volume ratio of small volume through-holes is 20-30% and a cell pitch of the large volume through-holes is approximately 2.5-5.0 mm.

Furthermore, JP-A-2001-334114 (page 6) discloses an exhaust gas filter in which a percentage of total sectional area of small volume through-holes to total sectional area of large volume through-holes is 40-120%.

FIG. 14 is a section view schematically showing a section of the above exhaust gas filter perpendicular to the longitudinal direction. In this exhaust gas filter 300, the above sectional form is a combination of small volume through-holes 302 having a section of oblong hexagon around the circumference of a large volume through-hole 301 having a section of hexagon, in which hexagonal large volume through-holes 301 and trapezoidal large volume through-holes 303 are arranged side by side in the vicinity of the outer periphery.

In the exhaust gas filters of the conventional techniques, there are existent two kinds of partitions such as a partition for directly flowing an exhaust gas in (hereinafter referred to as "direct inflow partition") and a partition for indirectly flowing an exhaust gas in (hereinafter referred to as "indirect inflow partition").

Therefore, when the exhaust gas filter starts to catch particulates, the exhaust gas is first caught by the direct inflow partition (FIG. 16(a)), but as the resistance caused by accumulation thickness of the particulates becomes gradually high, the exhaust gas easily flows in the indirect flow partition (FIG. 16(b)) to accumulate the particulates on the indirect inflow partition.

Locally viewing the wall portion of the filter, at an initial stage of easily catching particulates in the direct inflow partition (FIG. 16(a)-FIG. 16(b)), the flow amount of the exhaust gas is high at the direct inflow partition as compared with the indirect inflow partition. In addition, the amount of particulates caught is relatively equal or higher in the direct inflow partition, and hence violent combustion is liable to cause at the direct inflow partition.

At the next stage (FIG. 16(b)-FIG. 16(c), since the particulates are caught in the direct inflow partition, the exhaust gas hardly flows in the direct inflow partition as compared with the indirect inflow partition. That is, the flow amount of the exhaust gas becomes high in the indirect inflow partition as compared with the direct inflow partition. Noting the amount of particulates caught at this state, it is relatively much or equal in the direct inflow partition as compared with the indirect inflow partition. Therefore, the most violent combustion occurs at such a place that the flow amount of the gas is high and the amount of particulate caught is high. That is, it is considered that violent combustion easily occurs in the vicinity of a place contacting the direct inflow partition with the indirect inflow partition.

Therefore, when such a honeycomb structural body is used as a filter and regeneration treatment of such a filter is conducted, an uneven temperature distribution is caused by the combustion of particulates to locally apply a large thermal stress, so that a vital defect such as crack or the like occurs in the exhaust gas filter, and as a result, there is a problem of breaking the exhaust gas filter. Further, even if breakdown does not occur at once, thermal stress acts locally and repeatedly at the time of regeneration, so that there is a problem of lowering regeneration limit of the exhaust gas filter.

Further, when the exhaust gas filter is used over a long period of time, there is a problem of accumulating ash contained in the exhaust gas.

That is, as to the general filter, since the mechanism of particulate accumulation is constant, the ash accumulation condition is substantially constant. However, in case of changing an opening ratio (large and small volume through-holes), since the condition of particulate accumulation changes, the condition of ash accumulation is changed, so that when using over a long period of time, there are generated a wall surface accumulated with ash and a wall surface not accumulated with ash, and as a result, there is a problem that uneven ash accumulation is caused to bring about the increase of pressure loss.

The invention is made for solving the above problems inherent to the conventional techniques, and a main object thereof is to provide a honeycomb structural body having an excellent durability, which is large in the catching amount of particulates per unit volume and the no crack or the like is caused in the repetitive use over a long time of period.

Another object of the invention is to provide a honeycomb structural body, in which uneven ash accumulation hardly occurs even in the use over a long period of time.

DISCLOSURE OF THE INVENTION

The inventors have made various studies for attaining the above objects, and as a result, have developed a honeycomb structural body having essential feature and construction as mentioned below.

That is, the invention lies in a honeycomb structural body obtained by assembling one or plural pillar-shaped porous ceramic members, each being made by arranging a plurality of through-holes side by side in a longitudinal direction through partitions and plugging either one end of these through-holes, characterized in that an opening area at one end face of the honeycomb structural body is different from an opening area at the other end face thereof, and the ceramic member is made of silicon-ceramic composite material consisting of ceramic and silicon.

The honeycomb structural body of the invention is desirable to be constructed by having a group of large volume through-holes plugged so as to make relatively large a sum of opening areas at one end surfaces in a section perpendicular to the longitudinal direction, and a group of small volume through-holes plugged so as to make relatively small a sum of opening areas at one end small in the other section.

Further, the invention lies in a honeycomb structural body obtained by assembling one or plural pillar-shaped porous ceramic members, each being made by arranging a plurality of through-holes for the formation of cells side by side in a longitudinal direction through partitions and plugging either one end of these through-holes, characterized in that the porous ceramic member is made by combining a group of large volume through-holes plugged so as to make relatively large a sum of opening areas at one end surfaces in a section perpendicular to the longitudinal direction, and a group of small volume through-holes plugged so as to make relatively small a sum of opening areas at one end small in the other section, and the ceramic member is made of silicon-ceramic composite material consisting of ceramic and silicon.

Also, the invention is a honeycomb structural body, wherein the porous ceramic member has a relation that a distance between gravity centers of the large volume through-holes in the section perpendicular to the longitudinal direction is equal to a distance between gravity centers of the small volume through-holes in the section perpendicular to the longitudinal direction.

The large volume through-hole is preferable to be made of through-holes having a hole size larger than that of the small volume through-hole, and also it is preferable that the large volume through-hole constitutes a gas inflow side cell opened at an inlet side, and the small volume through-hole constitutes a gas outflow side cell opened at an outlet side.

In the honeycomb structural body, the porous ceramic member is preferable that a porosity of a wall portion partitioning the through-holes, that is, a partition is 30-80%, and a surface roughness of the partition is 0.1-30.0 μm as an arithmetic mean roughness (Ra) defined in JIS B 0601-2001.

Further, in the honeycomb structural body, the porous ceramic member is desirable that a half-width value of a peak of silicon (Si) (2θ=about 28°) in an X-ray diffraction is not more than 0.6°.

In the honeycomb structural body of the invention, it is desirable that as the through-hole are used two kinds of through-holes constituting a group of large volume through-holes plugged at one end portions with a plugging material and a group of small volume through-holes plugged at the other end portions with a plugging material. Also, it is desirable that the sectional shape of the through-hole is polygonal, particularly square and octagonal, and a corner part of the section of the through-hole is round or chamfered form. Further, it is desirable that an area ratio of section of the large volume through-hole perpendicular to the longitudinal direction to section of the small volume through-hole perpendicular to the longitudinal direction (large volume through-hole sectional area/small volume through-hole sectional area) is 1.01-9.00.

It is desirable to firm a coating layer of a catalyst on the surface of the partition separating the through-hole.

The ceramic particles constituting the honeycomb structural body is desirable to be silicon carbide.

The honeycomb structural body is desirable to be formed by bundling a plurality of the porous ceramic members made of silicon-ceramic composite material through a sealing material layer into a single structural body. Also, the invention is desirable to be used as a filter for purifying an exhaust gas including particular substance from a vehicle.

BRIEF DESCRIPTION OF THE DRAWINGS

FIGS. 6(a) to 6(c) are photographs showing a state of catching particulates observed at different positions from an inlet of the honeycomb filter of Example 1.1.

FIG. 16 is a view illustrating a state of catching particulates by the conventional honeycomb structural body.

BEST MODE FOR CARRYING OUT THE INVENTION

Figure 1:
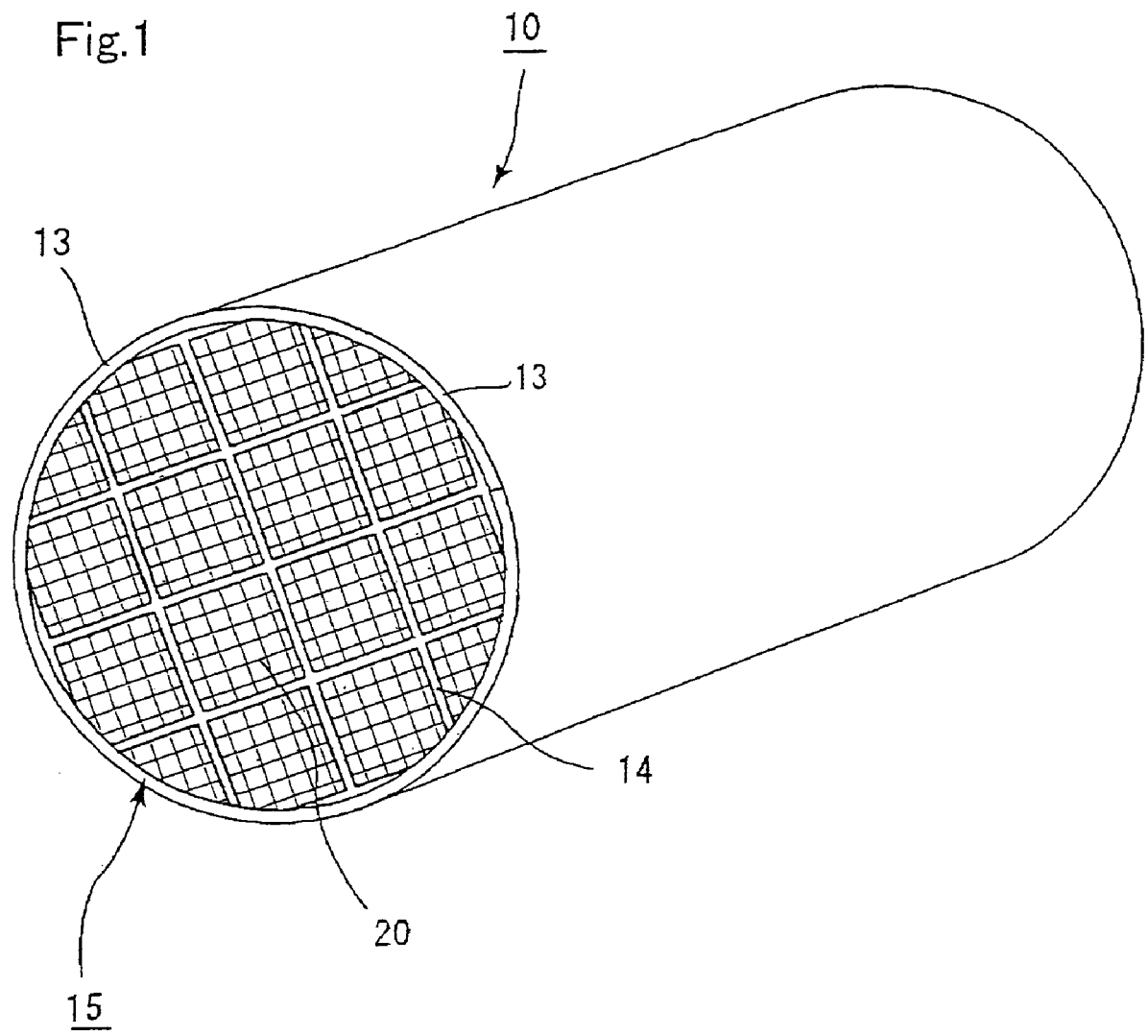
FIG. 1 is a perspective view schematically showing an embodiment of the honeycomb structural body according to the invention.

The invention is a honeycomb structural body made by arranging at least two kinds of through-hole groups comprised of a group of large volume through-holes and a group of small volume through-holes for the formation of cells flowing an exhaust gas from a vehicle therein through partitions side by side in the longitudinal direction, in which either one end portions of these through-holes are plugged, characterized in that the structural body is made of silicon-ceramic composite material consisting of ceramics and silicon.

As a preferable embodiment of the invention, in a honeycomb structural body made by bundling one or a plurality of pillar-shaped porous ceramic members by arranging at least two kinds of through-hole-groups comprised of a group of large volume through-holes and a group of small volume through-holes through partitions side by side in the longitudinal direction, and plugging either one end portions of these through-holes, it is desirable to provide such honeycomb structural body that the porous ceramic member of the structural body is made of a silicon-ceramic composite material joined by interposing metal silicon between ceramic particles for constructing this member.

The honeycomb structural body made by arranging at least two kinds of the large volume through-hole group and the small volume through-hole group through the partitions side by side in the longitudinal direction and plugging either one end portions of these through-holes is convenient for catching a large amount of particulates, but may be broken down by thermal stress as far as the strength of the filter is improved. Such a problem was considered to be due to the density (heat capacity) of the honeycomb structural body, but according to the inventors' study, it was found that even if the density is same, when the shapes of the through-holes are not the same, unevenness is generated at the time of catching or combustion to cause breakage.

In the invention, therefore, the occurrence of cracks due to thermal shock is prevented by using the silicon-ceramic composite material, which is formed by binding ceramic particles constituting a porous ceramic member with metallic silicon as a binder, as the porous ceramic member in the honeycomb structural body comprising through-hole groups in which sectional areas (e.g. sectional shapes) perpendicular to the longitudinal direction are not the same, in other word, the honeycomb structural body comprising a group of large volume through-holes and a group of small volume through-holes.

Also, the plurality of the though-holes formed in the honeycomb structural body comprise a group of large volume through-holes formed so as to make relatively large a sum of areas at a section perpendicular to the longitudinal direction, i.e. a total cell area (opening area) and plugged at one end portions, and a group of small volume through-holes formed so as to make relatively small the sum of areas at the section, i.e. the total cell area (opening area) and plugged at the other end portions.

Here, the through-holes for the formation of cells flowing an exhaust gas therein may be constituted in such a manner that when an area at the section perpendicular to the longitudinal direction of each through-hole is the same, the number of through-holes plugged at one end portions for constructing the large volume through-hole group is made larger than the number of through-holes plugged at the other end portions for constructing the small volume through-hole group, or in such a manner that the area at the section perpendicular to the longitudinal direction of the through-hole constructing the large volume through-hole group becomes relatively large, and the area at the section perpendicular to the longitudinal direction of the through-hole constructing the small volume through-hole group becomes relatively small.

Further, in the latter case, the number of through-holes constructing the large volume through-hole group and the number of through-holes constructing the small volume through-hole group are not particularly limited, and the number may be the same or different if the sum of areas at the section perpendicular to the longitudinal direction of the through-hole constructing the large volume through-hole group is larger than the sum of areas at the section perpendicular to the longitudinal direction constructing the small volume through-hole group.

Thus, in the invention, the repetition of the shape is produced as a basic unit, so that an area ratio at the sections of the cells is different viewing the basic unit. Therefore, when 1-2 cells in an outer peripheral portion are exactly measured, such cell may be included in the invention. In this case, measurement is carried out by removing 2 cells of the outer peripheral portion, or by omitting portion not included in the repetition of the basic unit.

Figure 10:
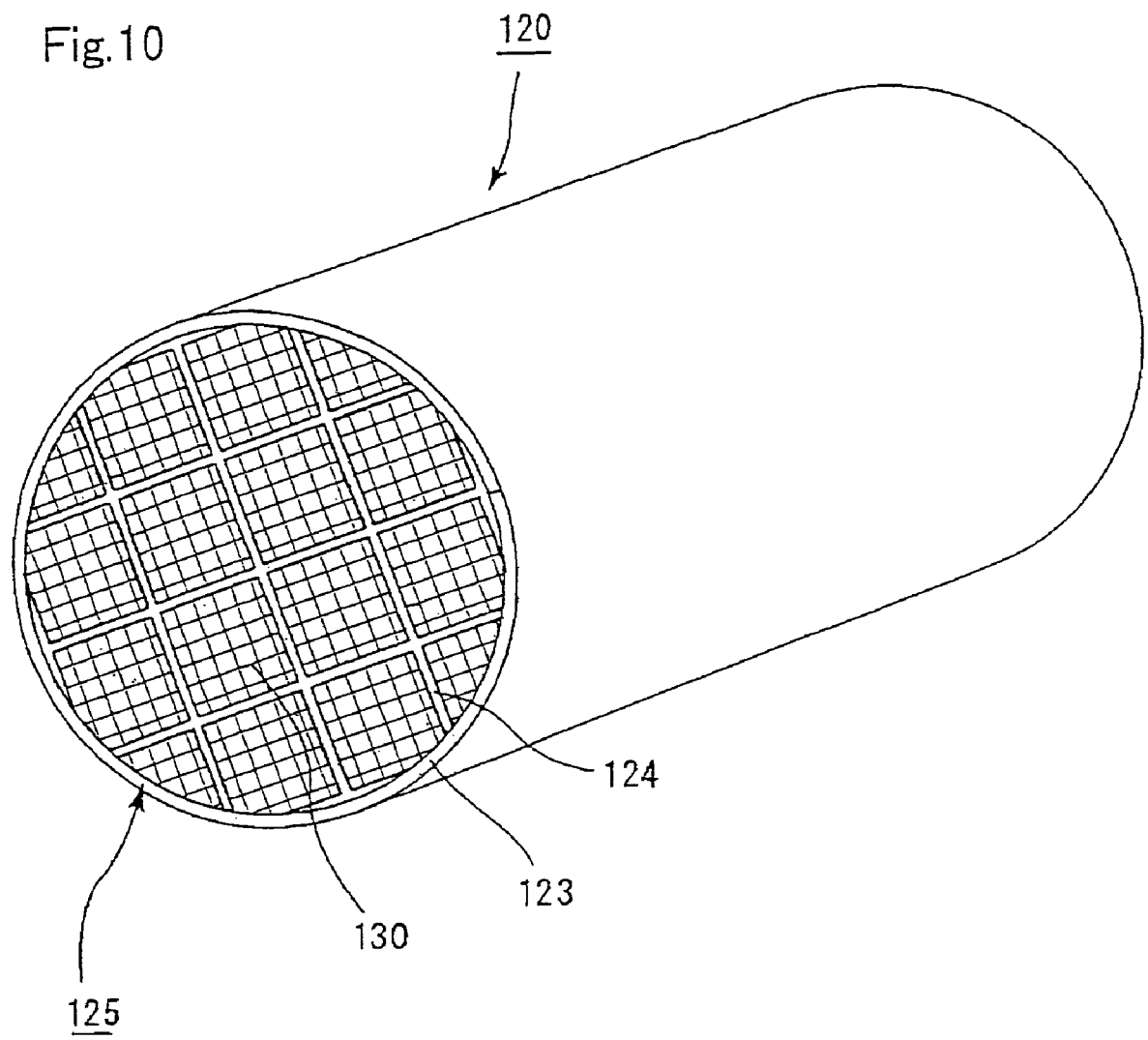
FIG. 10 is a perspective view schematically showing an embodiment of the conventional honeycomb structural body for the exhaust gas purifying device.
Figure 11A:
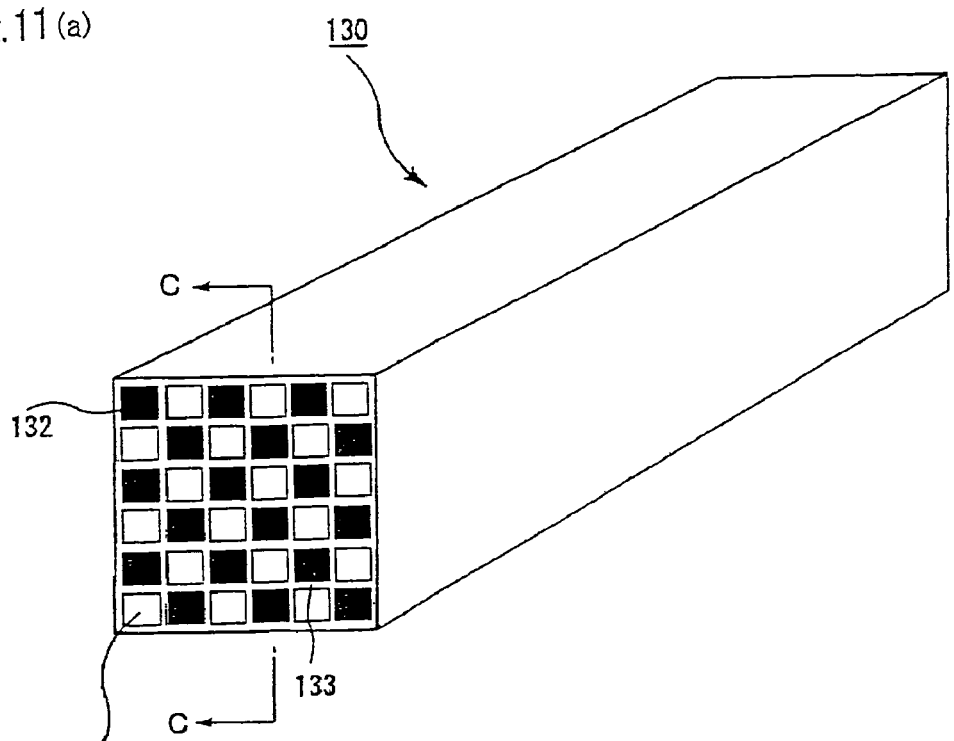
FIG. 11(a) is a perspective view schematically showing an example of the porous ceramic member constituting the conventional honeycomb structural body shown in FIG. 10.
Figure 11B:
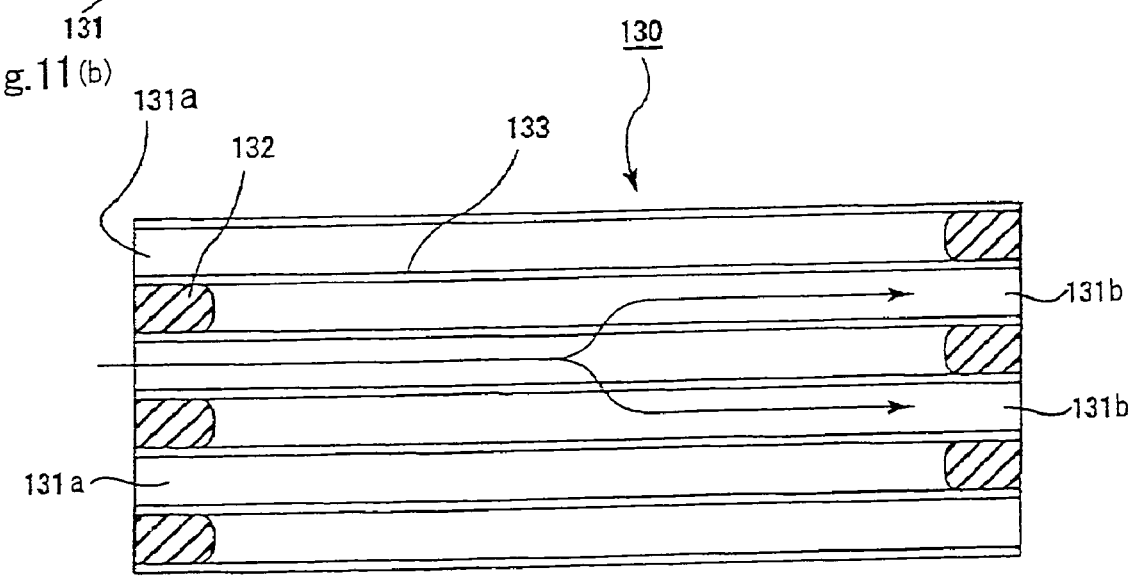
FIG. 11(b) is a sectional view taken along a line C-C of the porous ceramic member shown in FIG. 11(a).
Figure 12:
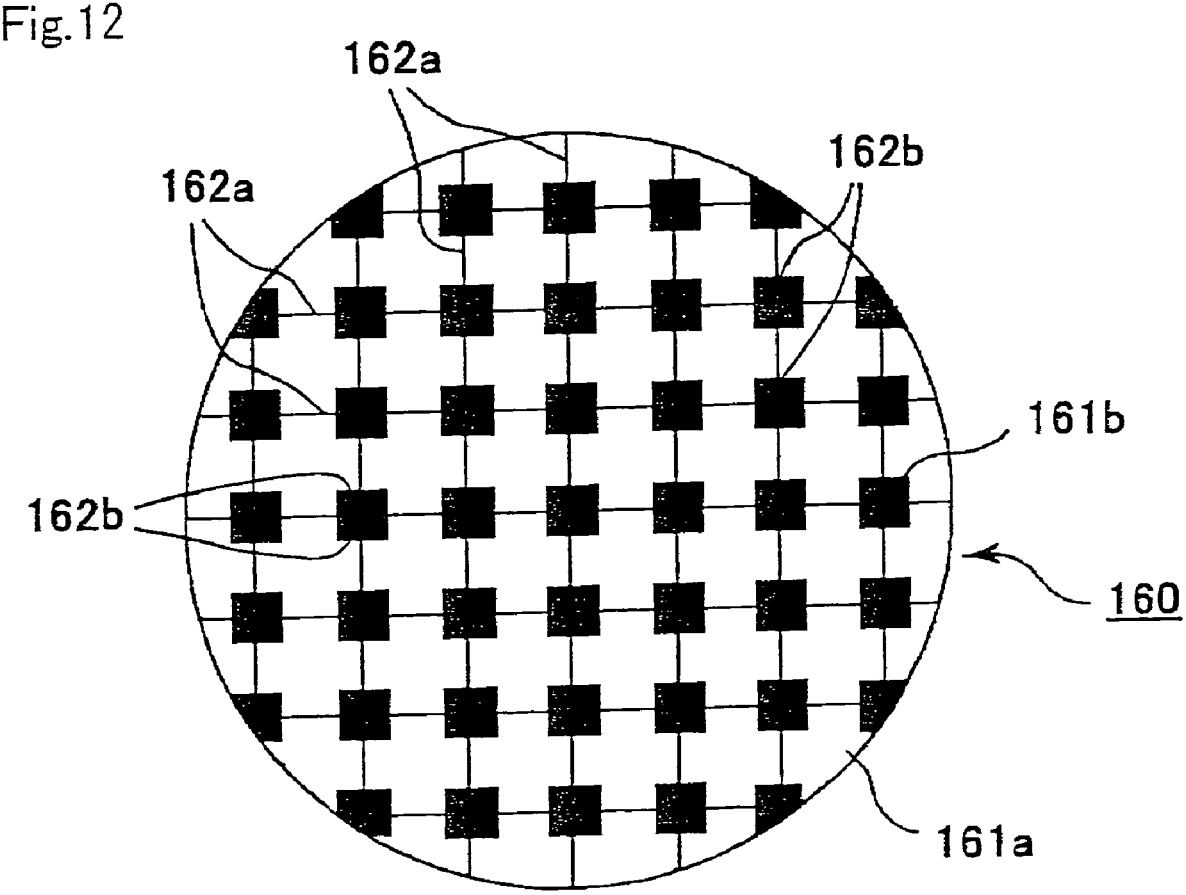
FIG. 12 is a cross-sectional view schematically showing one example of the conventional honeycomb filter.

For example, the honeycomb structural body of the invention does not include such a honeycomb structural body (see FIG. 10 and FIG. 11) that the sectional shape perpendicular to the longitudinal direction of through-hole is the same in portions other than the vicinity of the outer periphery, and the through-holes having the same sectional shape are plugged at either one end portions, and the plugged portion and the opened portion in each end face are arranged to exhibit a checkered pattern as a whole.

In the invention, as a material of the porous ceramic member is used a silicon-ceramic composite material. When this composite material is used, not only the thermal conductivity of the member is improved but also the bonding force between ceramic particles is particularly increased by silicon interposed between the ceramic particles, whereby the occurrence of the crack can be effectively prevented.

However, according to the inventors' studies, it is found that the porous ceramic member made of the silicon-ceramic composite material formed by binding ceramic particles through silicon tends to lower Young's modulus as compared with the case of not interposing silicon, and if Young's modulus is lowered, the deflection amount becomes small when the same power is applied, and hence the wall portion of the ceramic member is not deflected by vibrations of diesel engines or vibrations through pressure of the exhaust gas at the same degree and as a result, ash accumulated on the partition becomes hard to be peeled off.

As a result of various studies on the above problem, it is concluded that in order to facilitate the peeling-off of ash, it is effective to render the porosity of the partition in the honeycomb structural body (for example, porous ceramic member) into 30-80%, or the surface roughness (Ra) of the partition into 1.0-30.0 μm, or the thickness of the partition into 0.15-0.45 μm.

In the invention, when the porosity, surface roughness (Ra) and thickness of the partition in the honeycomb structural body are defined within the above numerical ranges, a large amount of particulates can be caught and at the same time, even if a large amount of ashes is accumulated, the ash peeling-off can be facilitated.

In the conventional exhaust gas honeycomb filter is used a porous ceramic member having a relatively small porosity and a relatively low Young's modulus. That is, the conventional filter having a relatively small porosity cannot facilitate the peeling-off of ashes as it is. However, when the porosity of the partition portion is made large as in the invention, the flowing of the exhaust gas into the inner walls of the pores is promoted, and hence lead a large partition to accelerate the peeling-off of ashes.

According to the invention, as the silicon-ceramic composite material is constituted by mixing two kinds of materials having different properties such as ceramics and silicon, when the porosity is made relatively large, it is considered to easily peel off the ashes accumulated on the partition.

As seen from the above, the invention is characterized in that the porous ceramic member constituting the honeycomb structural body is made of ceramics and silicon, particularly the silicon-ceramic composite material consisting of ceramic particles bonded by interposing silicon functioning as a jointing material. Particularly, the porosity of the partition made of such a composite material is desirable to be as relatively large as 30-80%, and further desirably 30-65%.

In the invention, the above mechanism is not always clear, but when the porosity is less than 30%, the inflow of the exhaust gas only occurs partially, and no sufficient vibration for peeling ashes on the whole wall occurs, and the ashes cannot easily be peeled off.

While, when the porosity of the partition exceeds 80%, the inflow of the exhaust gas becomes easy, but the vibration is not resonated but rather cancelled, and it is considered that the peeling effect of ashes is lowered. It is simply considered as a matter of course that ashes are caught within the wall. In addition, if the porosity exceeds 80%, the strength is lowered to make weak to the thermal shock.

Moreover, the porosity can be measured by the well-known methods, such as mercury injection method, Archimedes method, measurement through scanning electron microscope (SEM) and the like.

In the invention, the surface roughness of the partition is desirable to be within a range of 1.0-30.0 μm as calculated in terms of arithmetic mean roughness (Ra) defined in JIS B 0601-2001.

When the surface roughness (Ra) of the partition is less than 1.0, the mechanism is not clear, but the inflow of the exhaust gas hardly occurs and also the Young's modulus is low, so that the vibrations through the inflow of the exhaust gas hardly occurs, and the effect of peeling the ash becomes small. On the other hand, when the surface area (Ra) of the partition exceeds 30.0 μm, the inflow of exhaust gas easily occurs, but the vibration is not resonated but cancelled, so that it is considered that the effect of peeling the ash becomes small. It is simply considered as a matter of course that ashes can easily be caught within the wall.

In the invention, it is desirable that the thickness of the wall portion is made within a range of 0.15-0.45 mm in a point that the resistance to thermal shock is high and the ashes is peeled off easily.

Although the mechanism is not clear, when the thickness of the wall portion is larger than 0.45 mm, the inflow of the exhaust gas hardly occurs, and the Young's modulus is low, and hence the vibration through the inflow of the exhaust gas hardly occurs and the effect of peeling the ash is small, while when the thickness of the wall portion is less than 0.15 mm, the inflow of the exhaust gas easily occurs, but the vibration is not resonated but cancelled, and the effect of peeling the ash becomes small, and in addition thereto, strength is lowered to weaken to the thermal shock.

Also, in the honeycomb structural body of the invention, as silicon for bonding the ceramic particles by interposing among the ceramic particles constituting the silicon-ceramic composite material can be used, for example, monocrystal silicon, metallic silicon, amorphous silicon and the like. It is preferable to use silicon having a high crystallinity.

Concretely, it is desirable to use the porous ceramic member (silicon-ceramic composite material) having a half-width value of Si peak ($2\theta$=about 28°) in an X-ray diffraction of not more than 0.6°.

According to the inventors' studies, it is found that the thermal conductivity of the silicon-ceramic composite material joined by interposing silicon among ceramic particles largely changes the thermal conductivity of a honeycomb structural body obtained by the crystallinity of silicon. Further, it is found that as the crystallinity becomes higher, the ability of peeling and removing the ash is more improved with respect to the above-described peeling and removal of ash.

That is, the thermal conductivity of the honeycomb structural body becomes very excellent by increasing the crystallinity of silicon for bonding ceramic particles to such a degree that the half-width value of Si peak ($2\theta$=about 28°) in the X-ray diffraction of the honeycomb structural body is not less than 0.6°. As a result, the thermal diffusibility of the honeycomb structural body is improved, and even when the temperature distribution is produced in the honeycomb structural body or when cold cycle (thermal cycle) is repeated, the thermal stress is not excessively accumulated and the resistance to thermal shock becomes excellent.

Further, as the crystallinity of silicon becomes higher, the ability of peeling and removing the ash is more improved. Although the mechanism is not clear, it is considered that grid vibrations of silicon itself are easily caused by making the crystallinity higher, that is, silicon having a high crystallinity is easily resonated with the ceramic particles.

When the half-width value of Si peak ($2\theta$=about 28°) in the X-ray diffraction of the porous ceramic member exceeds 0.6°, since the crystallinity of silicon is low, even if silicon is used for joining the ceramic particles, the thermal conductivity of the honeycomb structural body becomes not sufficiently high, and the resistance to thermal shock is insufficient. Further, the grid vibration of silicon itself hardly occurs, and silicon is considered to cancel vibration of the ceramic particles at all.

Moreover, the half-width value of Si peak ($2\theta$=about 28°) in the X-ray diffraction of the porous ceramic member is desirable to be not less than 0.1°. When this peak value is less than 0.1°, the crystallinity of crystal silicon becomes too high, so that when the cold cycle (thermal cycle) is repeated in honeycomb structural body many times, there is caused a fear of generating minute cracks at the interface between ceramic particle and crystalline silicon. In such a case, the minute cracks are apt to further grow to large cracks, and also silicon and ceramic particles are hardly resonated by pulling each other, and the vibrations are considered to be easily cancelled.

The honeycomb structural body of the invention is composed of the pillar-shaped porous ceramic members in which a number of through-holes are arranged side by side in the longitudinal direction through the partitions, or may be composed as a combined assembly made by binding a plurality of the pillar-shaped porous ceramic members, each being formed by arranging a plurality of through-holes side by side in the longitudinal direction through partitions, through sealing material layers (hereinafter referred to as "assembly type honeycomb structural body"), or may be composed of the porous ceramic members formed as a single member (hereinafter referred to as "integral type honeycomb structural body").

In case of the assembly type honeycomb structural body, the wall portion is composed of a partition separating the through-holes of the porous ceramic members, an external wall of the porous ceramic member and a sealing material layer functioning as an adhesive layer between the porous ceramic members. In case of the integral type honeycomb structural body, the wall portion is composed of only one kind of partitions.

FIG. 1 is a perspective view schematically showing an embodiment of the assembly type honeycomb structural body as an example of the honeycomb structural body, FIG. 2(a) is a perspective view schematically showing one example of a porous ceramic member constituting the honeycomb structural body shown in FIG. 1, and FIG. 2(b) is a cross section taken along a line A-A of the porous ceramic member shown in FIG. 2(a).

Figure 2:
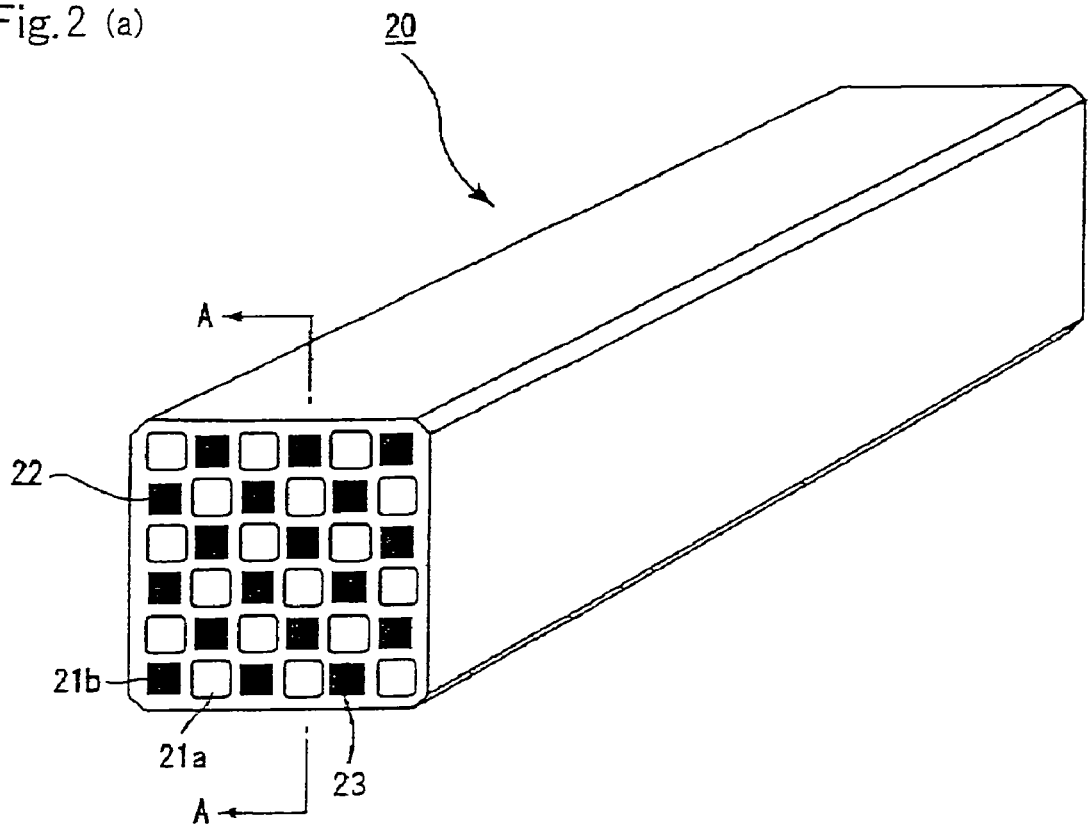
FIG. 2(a) is a perspective view schematically showing one example of the porous ceramic member constituting the honeycomb structural body shown in FIG. 1.
FIG. 2(b) is a sectional view taken along a line A-A of the porous ceramic member shown in FIG. 2(a).
Figure 2:
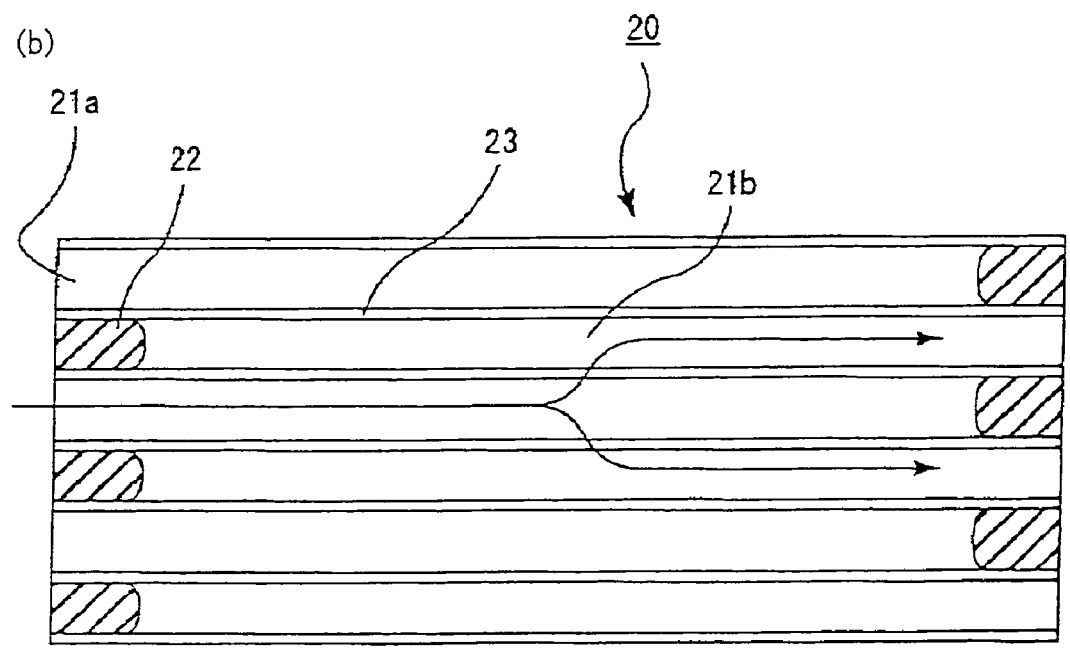

As shown in FIG. 1 and FIG. 2, the honeycomb structural body 10 (hereinafter referred to as "honeycomb filter" simply) according to the invention is constituted with a cylindrical ceramic block 15 by bundling a plurality of porous ceramic members 20 through sealing material layers 14, in which a sealing material layer 13 is arranged on an outer peripheral portion of the ceramic block 15.

In the porous ceramic member 20 are arranged a number of through-holes 21 side by side in the longitudinal direction. The through-holes 21 comprise two kinds of a large volume through-hole 21a having a relatively large area of a section perpendicular to the longitudinal direction and a small volume through-hole 21b having a relatively small area of the section. The large volume through-holes 21a are plugged with a plugging material 22 at the end portions for an exhaust gas outlet side of the honeycomb filter 10, while the small volume through-holes 21b are plugged with a plugging material 22 at the end portions for the exhaust gas inlet side of the honeycomb filter 10, and partitions 23 separating these through-holes 21a, 21b function as a filter.

That is, the exhaust gas flowed into the large volume through-holes 21a always passes through the partitions 23 separating these through-holes 21a, 21b and then flows out of the small volume through-holes 21b.

In the honeycomb filter of the invention, the large volume through-holes 21a flowing the exhaust gas therein are relatively larger in the volume than the small volume through-holes 21b passing after the pass through the partitions 23, and the area of the partition portions passing the exhaust gas (filtering area) is made small as compared with the honeycomb filter formed with through-holes having all the same volume.

In such a honeycomb filter, as shown in FIG. 6, particulates are uniformly accumulated on the partitions of the large volume through-holes 21a as a whole. It is considered that the exhaust gas directly flows in the wall of the filter (pass through the direct inflow partitions), from the large volume through-holes 21a toward the small volume through-holes 21b but also passes through the pore portion in the partition (pass through the indirect inflow partition) or causes whirls in the pores to produce various flows, and hence the particulates are uniformly accumulated on the walls of the large volume through-holes 21a.

As a result, the decrease of the filtering wall for directly flowing the exhaust gas and the resistance when the exhaust gas or the like is passed through the small volume through-holes become high, so that the initial pressure loss is somewhat poor as compared with the conventional filter provided with through-holes having the same volume.

In the honeycomb filter according to the invention, the particulates are uniformly accumulated on the walls of the large volume through-holes 21a with the lapse of time in use, and when the same amount of particulates are accumulated as compared with the conventional filter, it is possible to decrease the thickness of the particulates accumulated in the partition portion between the large volume through-hole 21a being largest in the flowing in the filter and the small volume through-hole 21b. Therefore, the pressure loss becomes small with the lapse of time from start as compared with the filter provided with the through-holes of the same volume.

In such a honeycomb filter, the increase of pressure loss can effectively be controlled, and a catchable amount of particulates per unit volume becomes large as compared with the conventional filter, and a period for requiring regeneration of the filter is prolonged.

As the accumulated amount of particulate (ash) becomes large, the filter cannot be used as it is, so that the filter is taken out from the exhaust pipe for reverse washing or thrown away. In the invention, a period of requiring such reverse washing can be prolonged to keep long life. Hereinafter, the period up to the reverse washing and the like is simply called as a life.

Figure 4:
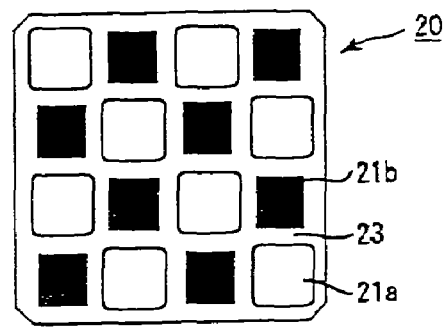
FIGS. 4(a)-4(d) are sectional views schematically showing the section of the porous ceramic member constituting the honeycomb structural body according to the invention perpendicular to the longitudinal direction thereof, respectively.
FIG. 4(e) is a sectional view schematically showing a section of a porous ceramic member constituting the conventional filter perpendicular to the longitudinal direction thereof.
Figure 4:
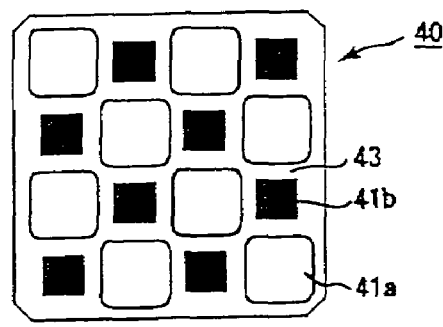
Figure 4:
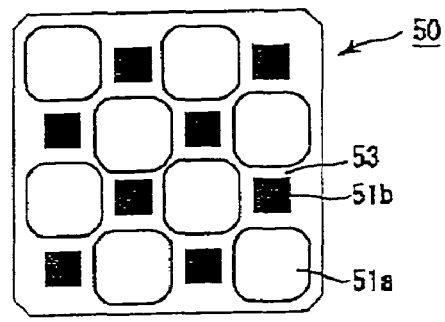
Figure 4:
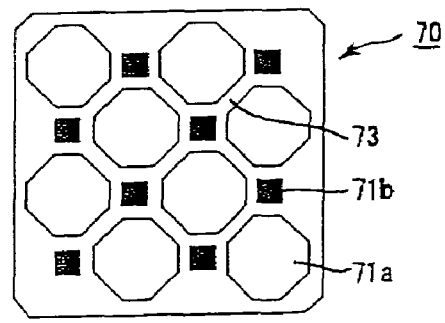
Figure 4:
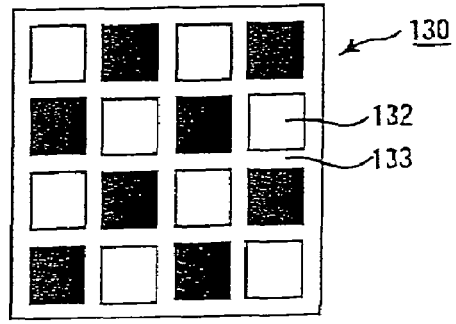

In the honeycomb structural body according to the invention, it is preferable to use two kinds of the through-holes, and it is particularly preferable to use the through-holes wherein a distance between gravity centers in sections of the adjacent large volume through-holes is made equal to a distance between gravity centers in sections of the adjacent small through-holes (see FIG. 4).

Moreover, the "distance between gravity centers in sections of the adjacent large volume through-holes" means a minimum distance between gravity centers in the section perpendicular to the longitudinal direction of one large volume through-hole and gravity center in the section perpendicular to the longitudinal direction of the other large volume through-hole, and the "distance between gravity centers in sections of the adjacent small volume through-holes" means a minimum distance between gravity centers in the section perpendicular to the longitudinal direction of one small volume through-hole and gravity center in the section perpendicular to the longitudinal direction of the other small volume through-hole.

Therefore, the large volume through-holes and the small volume through-holes are alternately arranged side by side through the partitions in top and bottom directions and right and left directions, and the gravity center in the section perpendicular to the longitudinal direction of the large volume through-hole and the gravity center in the section perpendicular to the longitudinal direction of the small volume through-hole in each direction are always existent on a straight line.

Accordingly, the "distance between gravity centers in sections of the adjacent large volume through-holes" and "distance between gravity centers in sections of the adjacent small volume through-holes" means a distance between gravity centers of adjoining large volume through-hole and small volume through-hole located in an oblique direction at the section perpendicular to the longitudinal direction.

In the honeycomb structural body having such construction, the exhaust gas flowed in the large volume through-holes 21a always passes through the partition 23 separating these through-holes 21a, 21b and then flows out from the small volume through-holes 21b.

Also, in the honeycomb structural body according to the invention, the distance between gravity centers in the sections of the adjacent large volume through-holes 21a and the distance between gravity centers in the sections of the adjacent small volume through-holes 21b are desirable to be equal to each other.

According to this construction, heat is uniformly diffused at the time of regeneration, and hence the temperature distribution tends to be easily uniform, and even when the use is repeated over a long period of time, there is generated no cracks resulted from the thermal stress, and the filter having an excellent durability can be provided.

Moreover, the sealing material layer 13 formed around the ceramic block 15 is formed for preventing the leakage of the exhaust gas from an outer periphery of the ceramic block 15 in case of using the honeycomb structural body 10 of the invention as the filter, or adjusting the shape. Therefore, it is not necessarily required in accordance with the use of the honeycomb structural body of the invention.

Figure 3A:
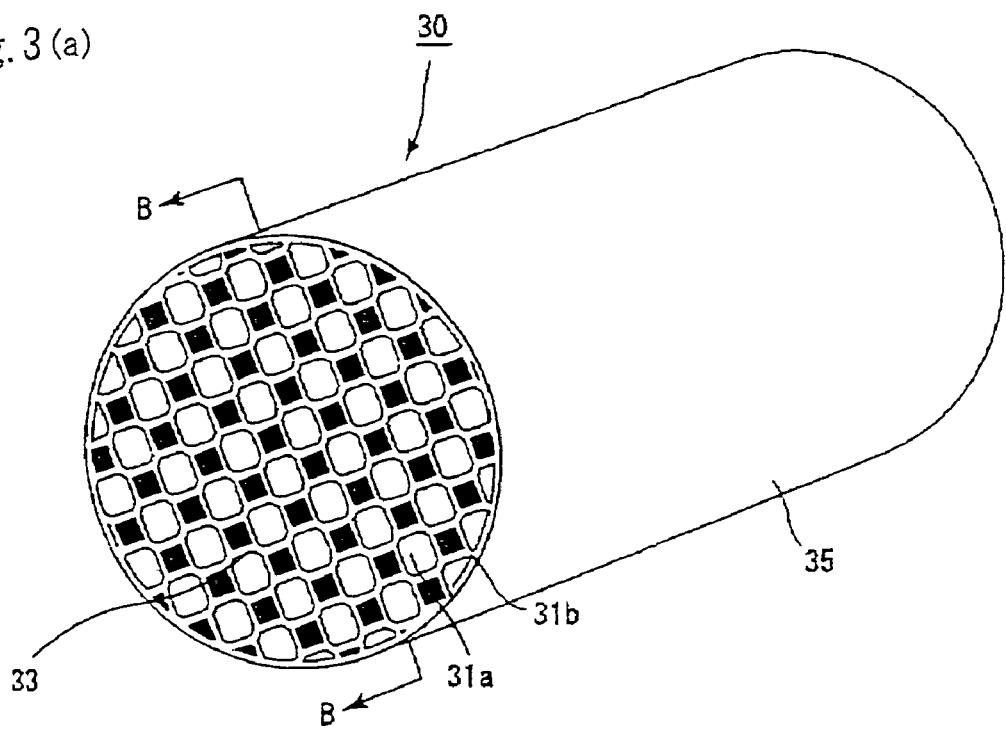
FIG. 3(a) is a perspective view schematically showing another embodiment of the honeycomb structural body according to the invention.
Figure 3B:
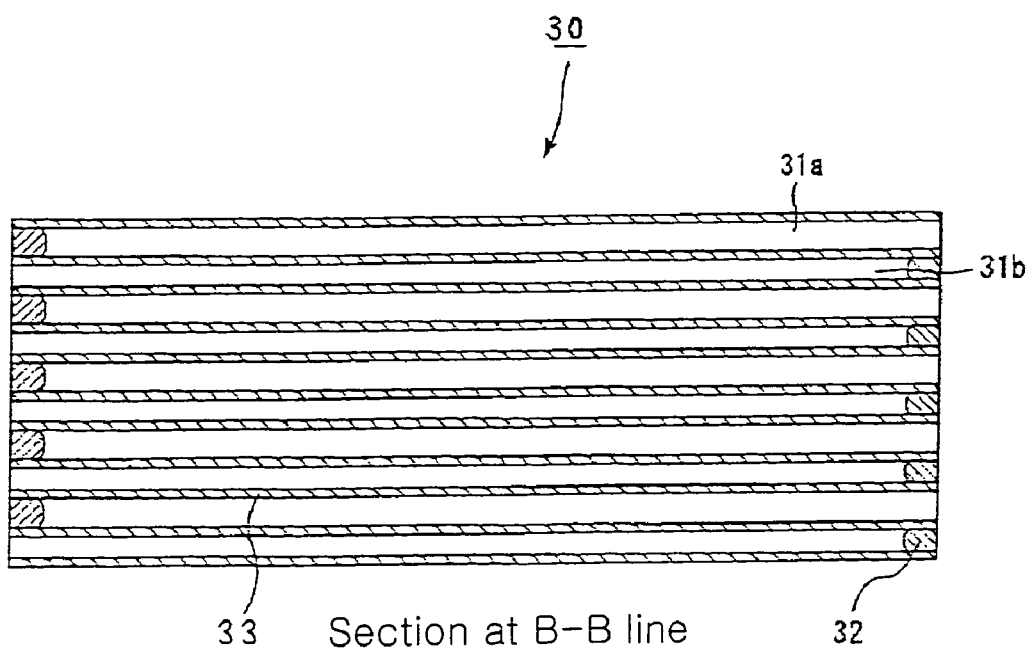
FIG. 3(b) is a sectional view taken along a B-B line of the honeycomb structural body shown in FIG. 3(a).

Also, FIG. 3(a) is a perspective view schematically showing an embodiment of the integral type honeycomb structural body as another embodiment of the honeycomb structural body according to the invention, and FIG. 3(b) is a section taken along a line B-B.

As shown in FIG. 3(a), the honeycomb filter 30 is constructed by including pillar-shaped porous ceramic blocks 35 in which a number of through-holes 31 are arranged side by side in the longitudinal direction through the partitions 33.

The through-holes 31 comprise two kinds of through-holes such as large volume through-holes 31a having a relatively large area of a section perpendicular to the longitudinal direction and small volume through-holes 31b having a relatively small area of the section, in which the large volume through-holes 31a are plugged with a plugging material 32 in the end portions at an exhaust gas outlet side of the honeycomb filter 30, while the small volume through-holes 31b are plugged with a plugging material 32 in the end portions at an exhaust gas inlet side of the honeycomb filter 30, and the partitions 33 separating these through-holes 31a, 31b function as a filter.

Although it is not shown in FIG. 3, a sealing material layer may be formed around the porous ceramic block 35 likewise the honeycomb filter 10 shown in FIG. 1.

This honeycomb filter 30 is constructed as in the honeycomb filter 10 except that the porous ceramic block 35 is an integral structure formed as one member. The exhaust gas flowed in the large volume through-holes 31a passes through the partitions 33 separating the through-holes 31a, 31b from each other and then flows out from the small volume through-holes 31b.

In the honeycomb filter according to the above embodiment, the large volume through-hole 31a flowing the exhaust gas therein is made relatively larger in the volume than the small volume through-hole 31b passed after the pass through the partition 33, and the area of the partition portion passing the exhaust gas (filtering area) becomes small as compared with the honeycomb filter provided with the through-holes of the entirely same volume.

However, in the honeycomb filter, as shown in FIG. 6, particulates are uniformly accumulated on the whole partition of the large volume through-hole 31a. This is considered that the exhaust gas directly flows in the wall of the filter from the large volume through-hole 31a toward the small volume through-hole 31b, and further passes through the pore portion in the partition and produces various flows such as whirlpools, and hence the particulates are uniformly accumulated on the walls of the large volume through-holes 31a.

As a result, the decrease of the filtering wall for directly flowing the exhaust gas and the resistance when the exhaust gas or the like is passed through the small volume through-holes become high, and the initial pressure loss is somewhat poor as compared with the filter provided with the through-holes having the entirely same volume.

However, with the lapse of use, the particulates are uniformly accumulated on the walls of the large volume through-holes 31a. When the same amount of the particulates is accumulated as compared with the conventional filter, it is possible to decrease the thickness of the particulates accumulated on the partition portion between the large volume through-hole 31a having the most many flows through the filter and the small volume through-hole 31b. Therefore, with the lapse of time from the start, the pressure loss becomes small as compared with the filter provided with the through-holes having the same volume.

In such a honeycomb filter, the increase of the pressure loss can be controlled, and the catchable amount of the particulates per unit volume becomes large as compared with the conventional filter and the period for requiring regeneration of the filter becomes long, and also the life is prolonged.

Also, in the above honeycomb filter 30, the distance between gravity centers in the sections of the adjacent large volume through-holes 31a and the distance between the gravity centers in sections of the adjacent small volume through-holes 31b are equally formed, so that heat is uniformly diffused at the time of regeneration to easily make the temperature distribution uniform, and even with repetitive use for a long period of time, the filter becomes excellent in durability without generating any cracks and the like due to thermal stress.

In the honeycomb structural body according to the invention, as the porous ceramic member is used a composite material formed by bonding ceramic particles by interposing silicon between the ceramic particles as previously mentioned.

As the ceramic particle usable in the invention, mention may be made of, for example, oxide ceramics such as cordierite, alumina, silica, mullite, zirconia, yttria and the like; carbide ceramics such as silicon carbide, zirconium carbide, titanium carbide, tantalum carbide, tungsten carbide and the like; nitride ceramics such as aluminum nitride, silicon nitride, boron nitride, titanium nitride and the like, but these ceramics are not only limited.

When the honeycomb structural body according to the invention is the assembly type honeycomb structural body shown in FIG. 1, it is desirable to use silicon carbide. Because silicon carbide is large in the thermal resistance, excellent in the mechanical properties and chemical stability and large in the thermal conductivity.

Also, when the honeycomb structural body according to the invention is the integral type honeycomb structural body shown in FIG. 3, it is desirable to use oxide ceramic such as cordierite or the like. Because it can be cheaply manufactured, is relatively small in the thermal expansion coefficient and is not broken on the way of using the honeycomb structural body according to the invention as a honeycomb filter and is not oxidized.

The thermal conductivity of the honeycomb structural body according to the invention is determined by the crystallinity of the silicon and kind of ceramic particles used. For example, when carbide ceramic or nitride ceramic is used as the ceramic particle, it is desirable that the lower limit of the thermal conductivity is 3 W/m·K and the upper limit is 60 W/m·K, and a range of 10-40 W/m·K is more desirable.

When the thermal conductivity is less than 3 W/m·K, the thermal conduction is poor, and the temperature gradient is easily caused in the longitudinal direction, and cracks easily occur as a whole. On the other hand, when it exceeds 60 W/m·K, the thermal conduction is good, but the thermal diffusion becomes large and the temperature hardly rises. Further, the heat outflow side tends to grow cold and the temperature gradient is easily caused at the end portion of the outflow side, and cracks easily occur.

When oxide ceramic (e.g. cordierite) is used as the ceramic particle, it is desirable that the lower limit of the thermal conductivity is 0.1 W/m·K and the upper limit is 10 W/m·K, and a range of 0.3-3 W/m·K is more desirable.

When the thermal conductivity is less than 0.1 W/m·K, the thermal conduction is poor and the temperature gradient is easily caused in the longitudinal direction, and cracks easily occur as a whole. On the other hand, when it exceeds 10 W/m·K, the thermal conduction is good, but the thermal diffusion becomes large, and the temperature does not easily rise. Further, the heat outflow side tends to grow cold, and the temperature gradient is easily caused at the end portion of the outflow side, and cracks easily occur as a whole.

In the honeycomb structural body according to the invention, the mean pore size (diameter) of the porous ceramic member is desirable to be about 5-100 µm. When the mean pore size is less than 5 µm, if the honeycomb structural body of the invention is used as the honeycomb filter, the clogging may be easily caused by particulates, while when it exceeds 100 µm, the particulates pass through the pores, and hence the particulates cannot be caught, and the honeycomb structural body may not function as a filter.

The particle size of the ceramic particle used in the production of such a ceramic member is desirable to be less in the contraction at the subsequent firing step, and it is desirable, for example, to combine 100 parts by weight of powder having a mean particle size of about 0.3-50 µm and 5-65 parts by weight of powder having a mean particle size of about 0.1-1.0 µm. Because, the porous ceramic member having necessary characteristics can be advantageously produced by mixing ceramic particle powders having such particle sizes at the above mixing ratio.

In the honeycomb structural body according to the invention, as a plugging material used for plugging the end portions of the through-holes in the ceramic members, it is desirable to use a porous ceramic. Because, when the plugging material is the same porous ceramic as in the ceramic member, the adhesion strength between both can be increased. Also, the porosity of the plugging material is adjusted likewise the aforementioned ceramic block, whereby the thermal expansion coefficient of the ceramic block can be matched with the thermal expansion coefficient of the plugging material, and hence it is made possible to prevent the formation of a gap between the plugging material and the wall portion due to thermal stress at the manufacturing or using time, and the occurrence of cracks in the plugging material or the wall portion contacted with the plugging material.

When the plugging material is made of porous ceramic, there can be used, for example, the same material as the ceramic particle and silicon constituting the above-described ceramic member.

When the honeycomb structural body according to the invention is the assembly type honeycomb structural body shown in FIG. 1, sealing material layers 13, 14 are formed between the porous ceramic members 20 and on the outer peripheral surface of the ceramic block 15. And also, the sealing material layer 14 formed between the porous ceramic members 20 functions as an adhesive for bundling the plural porous ceramic members, while the sealing material layer 13 formed on the outer peripheral surface of the ceramic block 15 functions as a plugging material for preventing the leakage of the exhaust gas from the outer periphery of the ceramic block 15 when the honeycomb structural body of the invention is used as the honeycomb filter or when the honeycomb structural body 10 of the invention is used as the ceramic filter or when the honeycomb structural body 10 of the invention is placed in an exhaust path of an internal combustion engine.

As a material constituting the sealing material layer, mention may be made of, for example, an inorganic binder, an organic binder, and inorganic fibers and/or inorganic particle.

The sealing material layer is formed between the porous ceramic members and on the outer periphery of the ceramic block, but these sealing material layers may be made of the same or different material. Further, when the sealing material layers are made of the same material, the compounding ratio of the material may be same or different.

As the inorganic binder contained in the sealing material, mention may be made of, for example, silica sol, alumina sol and the like. They may be used alone or in a combination of two or more. Among the inorganic binders, silica sol is desirable.

As the organic binder contained in the sealing material, mention may be made of, for example, polyvinyl alcohol, methyl cellulose, ethyl cellulose, carboxymethyl cellulose and the like. They may be used alone or in a combination of two or more. Among these organic binders, carboxymethyl cellulose is desirable.

As the inorganic fiber contained in the sealing material, mention may be made of, for example, ceramic fibers of silica-alumina, mullite, alumina, silica and the like. They may be used alone or in a combination of two or more. Among these organic fibers, silica-alumina fiber is desirable.

As the inorganic particles contained in the sealing material, mention may be made of, for example, carbides, nitrides and the like. Concretely there may be mentioned inorganic powder or whisker of silicon carbide, silicon nitride, boron nitride and the like. They may be used alone or in a combination of two or more. Among these inorganic particles, silicon carbide having an excellent thermal conductivity is desirable.

The sealing material layer 14 may be a dense body. However, when the honeycomb structural body of the invention is used as the honeycomb filter, a porous body is preferable for enabling the exhaust gas to flow into the inside. The sealing material layer 13 is desirable to be a dense body. Because, the sealing material layer 13 is formed for the purpose of preventing the leakage of the exhaust gas from the outer periphery of the ceramic block 15 when the honeycomb structural body 10 of the invention is placed in the exhaust path of the internal combustion engine.

The honeycomb structural body according to the invention shown in FIGS. 1-3 is cylindrical, but it is not limited thereto, and it is enough to be pillar. For example, it may be any pillar bodies, such as oval columnar, square columnar and the like.

The shape of the section perpendicular to the longitudinal direction of the large volume through-hole or small volume through-hole (hereinafter simply referred to as "section") is desirable to be polygonal in the honeycomb filter according to the invention. Because, the area of the wall portion in the section perpendicular to the longitudinal section of the filter can be decreased by rendering the shape into a polygon, and as a result, an area ratio of a section of the large volume through-hole to the above section (large volume through-hole group sectional area/small volume through-hole group sectional area) (hereinafter simply referred to as "opening ratio") can easily be increased, and hence there can be realized a filter being rich in the durability and long in the life. Among polygons, a polygon more than a square is desirable, and particularly the sectional shape of the large volume through-hole is desirable to be octagonal. If the shape is made circular or elliptic, the area of the section at the wall portion becomes large, and it is difficult to increase the opening ratio.

Moreover, the section of only the large volume through-hole may be square, pentagonal, trapezoidal, octagonal or the like. Only the small volume through-hole may be polygonal as described above. Both the sections may be polygonal. Further, various polygons may be admixed.

The opening ratio of the honeycomb structural body according to the invention is desirable to be 1.01-9.00, more desirably 1.01-6.00. When the opening ratio is less than 1.01, any function and effect inherent to the invention are hardly produced, while when it exceeds 9.00, the volume of the small volume through-hole for flowing the exhaust gas passed through the wall portion is too small and the pressure loss becomes too large.

FIGS. 4(a)-(d) are a section view schematically showing a part of the porous ceramic member for constructing an assembly type filter, while FIG. 4(e) is a section view schematically showing a part of the conventionally used filter.

Moreover, the shape of sections of the small volume through-hole and the large volume through-hole in an integral type filter is also the same combination as in the assembly type filter, so that the sectional shapes of the small volume through-hole and the large volume through-hole in the filter of the invention are explained with reference to FIG. 4.

The opening ratios of the porous ceramic member filters shown in FIGS. 4(a)-(e) are 1.55 (a), 2.54 (b), 4.45 (c), 9.86 (d) and 1.00 (e), respectively.

Also, the shape of the section perpendicular to the longitudinal direction of the large volume through-hole illustrated in this figure is octagonal, and that of the small volume through-hole is square (regular square).

A corner portion of the section of the above large volume through-hole and/or the small volume through-hole is desirable to be formed into an arc (curve-like). Because, stress concentration at the corner portion of the through-hole can be prevented, and the occurrence of cracks can be prevented.

As shown in FIGS. 4(a)-(d), the corner portion of the outer periphery of the porous ceramic member is desirable to be chamfered. In this case, stress concentration at the corner portion can be prevented, and also the occurrence of cracks can be prevented.

In the porous ceramic member 70 shown in FIG. 4(d), the distance between gravities in the section of the large volume through-hole 71a and the distance between gravities in the section of the small volume through-hole 71b are equal, but the opening ratio is as large as 9.86. In this case, as the opening ratio exceeds 9.00, the volume of the small volume through-hole 71b flowing the exhaust gas therein after passing through the wall portion 73 is too small, and the pressure loss becomes too large, so that it is desirable to use a porous ceramic member having the partition 73 of the large pore as described above.

In the honeycomb structural body having such a construction, it is desirable that the section of the through-hole is not changed over the full length thereof. Because it can easily be manufactured by extrusion molding or the like.

The honeycomb structural body according to the invention is desirable to be placed in an exhaust passage of an internal combustion engine such as diesel engine and the like as a filter (DPF), in which particulates of the exhaust gas discharged from the internal combustion engine are caught by the partition when passing through the filter, and the exhaust gas is purified.

Also, when the honeycomb structural body according to the invention is used as a honeycomb filter for purifying the exhaust gas, it is desirable that on the wall portion of the ceramic block is carried a catalyst such as Pt or the like for accelerating combustion of particulates in the regeneration treatment of the honeycomb filter.

Further, by carrying a catalyst of, for example, a noble metal such as Pt, Rh, Pd or the like or an alloy thereof on the honeycomb structural body of the invention can be used the honeycomb structural body of the invention as a catalyst carrier for converting HC, CO and $NO_x$ in the exhaust gas discharged from a heat engine such as internal combustion engine or a combustion system such as a boiler, or reforming liquid fuel and gas fuel.

As the catalyst may be used any ones which can accelerate combustion of particulates or convert CO, HC and $NO_x$ in the exhaust gas, which is desirable to add, for example, am alkali metal (Group 1 of the Periodic Table), an alkali earth metal (Group 2 of the Periodic Table), a rare earth element (Group 3 of the Periodic Table), a transition metal element or the like in addition to the noble metal.

Moreover, when the honeycomb structural body of the invention is used as only the catalyst carrier, the plugging material is not necessarily required.

Also, since the catalyst is coated on the ceramic, the coating may be conducted so as to leave pores or the coating may be applied to the wall, but it is desirable to coat the catalyst so as to leave pores in case of catching and regenerating the particulates.

Next, an example of the method of manufacturing the honeycomb structural body according to the invention is explained.

When the structure of the honeycomb structural body of the invention is an integral type honeycomb structural body integrally formed as a whole as shown in FIG. 3, the extrusion molding is first carried out by using raw material paste consisting essentially of ceramic particles and silicon as described above to prepare a ceramic shaped body having substantially the same shape by extrusion molding as the honeycomb structural body 30 shown in FIG. 3.

In the extrusion molding, the ceramic shaped body can be prepared by continuously extruding the raw material paste through a metal die disposed at a front end portion of an extruder and provided with many holes and cutting into the predetermined length. In the production of the honeycomb structural body of the invention, however, it is desirable to adjust the surface roughness by subjecting wall face of fine hole, slit or the like of the die to a polishing treatment or the like. Since the wall surface of the pore, slit in the die is a portion directly contacting with the raw material paste in the extrusion molding, if the surface roughness of the wall surface is high, the surface roughness of the inner wall of the through-hole in the ceramic shaped body to be produced becomes large, and it becomes difficult to adjust the surface roughness of the through-hole inner wall of the honeycomb structural body produced through a post step.

In the resent invention, the surface roughness of the partition may be adjusted by using a pore forming material having a pore forming action.

Further, it is possible to adjust the surface roughness by adjusting a viscosity of the raw material paste, particle sizes of various materials, a compounding ratio thereof and the like.

The raw material paste is desirable so that the porosity of the ceramic member after the production is 30-80%, and there can be used, for example, ones obtained by adding a binder and a dispersion medium to a mixed powder of ceramic particle powder and powdered silicon.

When the honeycomb structural body is produced from the silicon-ceramic composite material made by connecting ceramic particles with silicon as in the invention, it is desirable to use the powdered silicon obtained by pulverizing silicon having a high crystallinity such as monocrystal silicon.

The powdered silicon is melted during the heat treatment after the degreasing treatment described later to wet the surfaces of ceramic particles, which plays a role as a jointing material for bonding ceramic particles each other. The compounding amount of such silicon is properly changed in accordance with the particle size, shape and the like of the ceramic particle powder, but is desirable to be 5-50 parts by weight per 100 parts by weight of the mixed powder.

When the compounding amount of silicon is less than 5 parts by weight, the compounding amount of powdered silicon is too small to sufficiently perform the role as the jointing material for bonding ceramic particles together, and the strength of the resulting honeycomb structural body (ceramic member) becomes insufficient.

While, when the compounding amount of silicon exceeds 50 parts by weight, the resulting honeycomb structural body is too dense and the porosity lowers, and when the honeycomb structural body of the invention is used, for example, as a honeycomb filter for purifying the exhaust gas, the pressure loss during the catching of particulates immediately becomes high, and there is a fear that the body does not sufficiently act as a filter.

As the binder contained in the raw material paste can be used, for example, methyl cellulose, carboxy methyl cellulose, hydroxy ethyl cellulose, polyethylene glycol, phenol resin, epoxy resin and the like.

The compounding amount of the binder is usually desirable to be about 1-10 parts by weight per 100 parts by weight parts of the ceramic particle powder.

As the dispersion medium can be used, for example, an organic solvent such as benzene or the like, an alcohol such as methanol or the like, water and so on. The dispersion medium is compounded in a proper amount for making the viscosity of the raw material paste within a certain range.

These mixed powder, binder and dispersion medium are mixed with an attriter or the like and sufficiently kneaded with a kneader or the like to form raw material powder, and thereafter the raw material paste is extrusion molded to prepare the ceramic shaped body.

To the raw material paste may be added a molding assistant, if necessary. As the molding assistant can be used, for example, ethylene glycol, dextrin, fatty acid soap, polyalcohol and the like.

To the raw material paste may be further added a pore forming material such as balloon as a micro hollow spherical body consisting essentially of oxide ceramic, spherical acryl particle, graphite and the like.

As the balloon can be used, for example, alumina balloon, glass microballoon, shirasu balloon, flyash balloon (FA balloon), mullite balloon and the like. Among them, alumina balloon is desirable.

Next, the thus obtained ceramic shaped body is dried by using a micro wave drier, a hot gas drier, a dielectric drier, a reduced pressure drier, a vacuum drier, a freeze drier or the like to form a ceramic dried body, and thereafter, a plugging material paste as a plugging material is filled in given through-holes to conduct a plugging treatment for plugging the through-holes.

As the plugging material (filler) paste can be used, for example, those similar to the raw material paste, but it is desirable to add a lubricant, a solvent, a disperser and a binder to the mixed powder used in the raw material paste. Because the sedimentation of the ceramic particles in the plugging material paste can be prevented on the way of the plugging treatment.

Next, the ceramic dried body filled with the plugging material paste is heated at about 150-700° C. to remove the binder contained in the ceramic dried body, which is subjected to a degreasing treatment to form a ceramic degreased body.

The degreasing treatment is desirable to be carried out at a temperature lower than that melting silicon, and also its degreasing atmosphere may be an oxidizing atmosphere or an inert gas atmosphere such as nitrogen, argon or the like.

Moreover, as the degreasing atmosphere, any appropriate atmosphere is selected by considering the amount of the binder used, the kind of ceramic particle and the like.

Next, the ceramic degreased body is heated at about 1400-1600° C. to soften (melt) the powdered silicon, whereby the ceramic particles are bonded through silicon to form a ceramic porous body.

In the invention, for the purpose of changing the surface roughness are adjusted the degreasing and firing conditions of the ceramic dried body. That is, in the degreasing and firing, the pore forming material, molding assistant and the like may be volatilized from the ceramic member to form pores, but in such a case, it is necessary to pass sufficient atmosphere gas into the through-holes.

Moreover, the half-width value of Si peak ($2\theta$=about $28°$) in the X-ray diffraction of the ceramic porous body exceeds $0.6°$, and its crystallinity is low.

The ceramic porous body is further heated at 1800-2100° C. to crystallize silicon bonding the ceramic particles to thereby form crystalline silicon, whereby there can be produced the honeycomb structural body (ceramic block) of the invention consisting of porous ceramic and formed as a whole.

Moreover, the half-width value of Si peak ($2\theta$=about $28°$) in the X-ray diffraction of the thus obtained honeycomb structural body becomes not more than $0.6°$, and its crystallinity becomes very high.

Further, in case of producing a honeycomb structural body by bonding the ceramic particles with silicon having such a low crystallinity that the half-width value of Si peak in X-ray diffraction exceeds $0.6°$, it is preferable to adopt a method wherein silicon having a low crystallinity such as amorphous silicon is used as the powdered silicon, and the heating is carried out at 1400-1600° C. to bond the ceramic particles through silicon.

When the structure of the honeycomb structural body of the invention is an assembly type honeycomb structural body made by bundling a plurality of porous ceramic members through a sealing material layer as shown in FIG. 1, the extrusion molding is first carried out with the use of the raw material paste consisting essentially of the above-described ceramic particles and silicon to form a green shaped body having a shape similar to a porous ceramic member 20 shown in FIG. 2.

Moreover, as the raw material paste can be used the same as the raw material paste explained in the integral honeycomb structural body.

Next, the green shaped body is dried with the use of a microwave drier or the like to form a dried body, and thereafter a plugging material paste as a plugging material is filled in given through-holes of the dried body to conduct a plugging treatment for plugging the through-holes.

Moreover, as the filling paste can be used the same as the filling paste explained in the integral honeycomb structural body, and as the plugging treatment can be used the same method as in the integral honeycomb structural body, except that the object for filling the filling paste is different.

Further, the dried body after the plugging treatment is subjected to a degreasing treatment under the same conditions as in the integral honeycomb structural body to form a ceramic porous body, and further to heating and firing under the same conditions as in the integral honeycomb structural body, whereby there cane be produced a porous ceramic member in which a plurality of through-holes are arranged side by side in the longitudinal direction through partitions.

Then, a laminated body of square-pillar porous ceramic members 20 having a predetermined size is prepared by repeating a step of applying a plugging material paste as a plugging material layer 14 in a uniform thickness and successively laminating other porous ceramic members 20.

Moreover, a material constituting the pluggging material paste is as explained in the honeycomb structural body of the invention and the explanation thereof is omitted here.

Next, the laminated body of the porous ceramic members 20 is heated to dry and solidify the sealing material paste layer 51 to thereby form a sealing material layer 14, and thereafter, an outer peripheral portion thereof is cut into a shape shown in FIG. 1 with, for example, a diamond cutter or the like to produce a ceramic block 15.

On an outer peripheral portion of the ceramic block 15 is formed a sealing material layer 13 by using the above sealing material paste, whereby there can be produced the honeycomb structural body of the invention constructed by bundling a plurality of the porous ceramic members through the sealing material layer.

Also, on the partition surface of the honeycomb structural body according to the invention may be provided a catalyst coat layer carried with a catalyst capable of accelerating combustion of particulates or converting CO, HC, $NO_x$ and the like in the exhaust gas.

As the catalyst can be used, for example, noble metals such as platinum, palladium, rhodium and the like. In addition to the noble metal, an alkali metal (Group i of the Periodic Table), an alkali earth metal (Group 2 of the Periodic Table), a rare earth element (Group 3 of the Periodic Table), a transition metal element or the like may be added, if necessary.

The catalyst coat layer is a layer formed on the surface of the ceramic member, particularly on the surface of the particle constructing the partition, and requires at least the use of the catalyst consisting of the noble metal, but it is desirable to carry the catalyst through a support material layer made of alumina, zirconia, titania or silica having a high specific surface.

The catalyst coat layer explained below is explained with reference to an example of using platinum as a catalyst and alumina as a support material layer.

First, as a solution producing method, a solution is produced by minutely pulverizing powder for the support material by means of a crusher or the like, stirring and mixing the powder for support material with a solution. Concretely, oxide powder such as γ-alumina or the like is first produced by a sol-gel method. In this case, it is desirable to have a high specific surface area as far as possible for using as a coat layer for the catalyst, and it is preferable to select so as to have a high specific surface value of more than 250 m²/g. Therefore, it is desirable to select γ-alumina because the specific surface area is high.

The above powder is added with about 5-20 wt % of an inorganic binder such as hydrated alumina, alumina sol, silica sol or the like, or a solvent such as pure water, water, alcohol, diol, polyhydric alcohol, ethylene glycol, ethylene oxide, triethanol amine, xylene or the like, and then pulverized with stirring.

In fact, the oxide (alumina) used as a support material is pulverized until it becomes not more than about 500 nm. Different from the catalyst coat layer coated on the surface of the partition by the conventional wash coat technique, the alumina film can be uniformly formed on the partition particle of the ceramic member by the finely pulverizing.

Next, the solution containing the metal oxide powder is applied to the partition surface of the ceramic member, and impregnated thereinto. In this case, the firing is carried out after it is dried by heating at 110-200° C. for about 2 hours.

The temperature of the firing is preferably 500-1000° C., and the treating time is preferably 1-20 hours. If the temperature is lower than 500° C., the crystallization does not proceed, while when it exceeds 1000° C., the crystallization extremely proceeds and the surface area tends to be lowered. Also, the carrying amount can be calculated by measuring mass before and after these steps.

Moreover, before the impregnation of alumina, it is desirable to conduct a treatment for improving the wettability on each surface of the particles at the partition of the ceramic member. For example, when the surfaces of silicon carbide particles are modified by HF solution, the wettability with the catalyst solution is improved, and hence the surface roughness after the formation of the catalyst coat layer becomes high.

Next, platinum is carried. A solution containing platinum is added dropwise through pipette at only an amount absorbed by the ceramic member, and thereafter dried at 110° C. for 2 hours and dried in nitrogen atmosphere at 500-1000° C. to conduct metallization.

Figure 5:
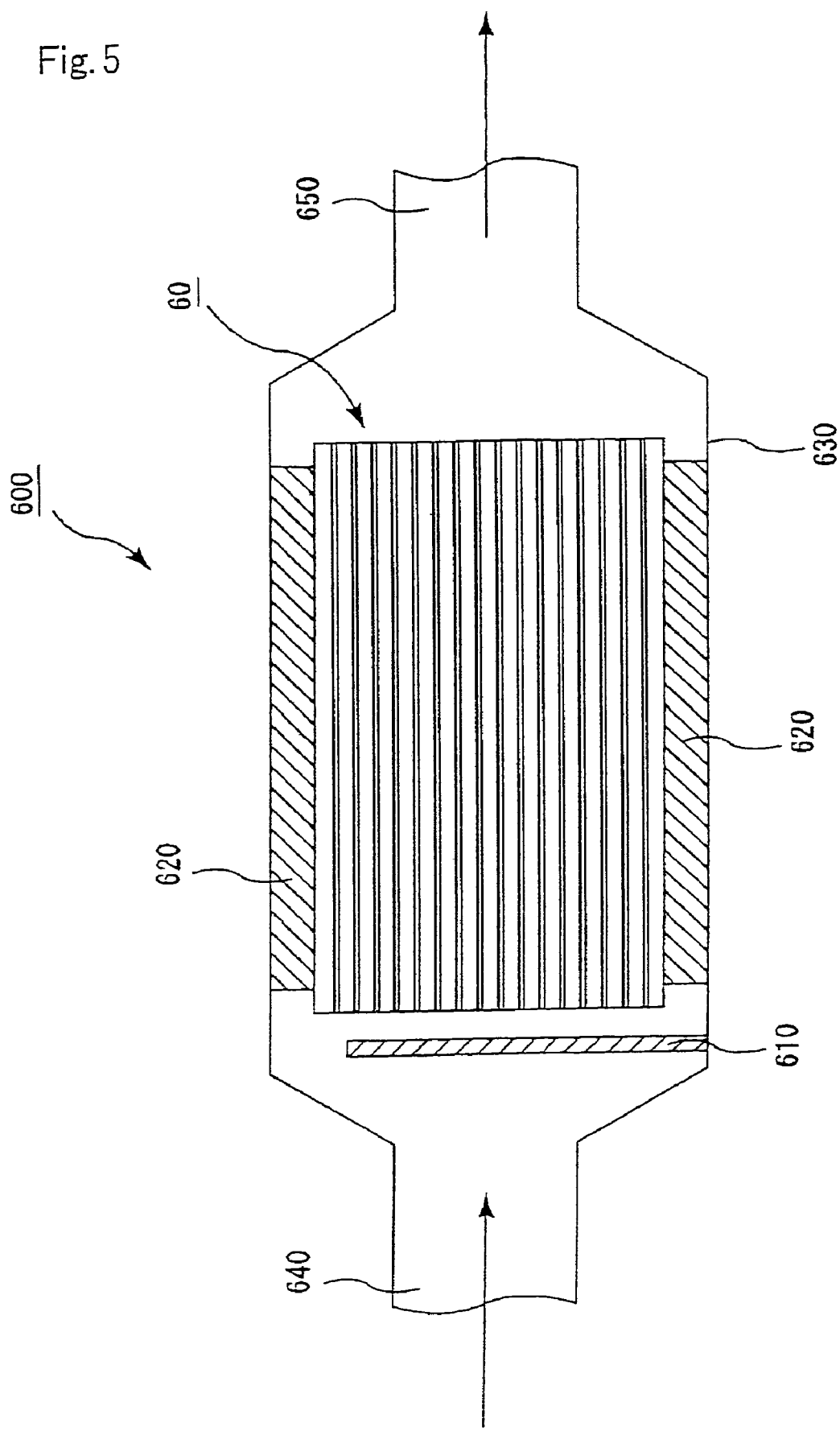
FIG. 5 is a sectional view schematically showing an embodiment of the exhaust gas purifying device using the honeycomb structural body according to the invention.

The application of the filter according to the invention as mentioned above is not particularly limited, but when it is used in the apparatus for the purification of the exhaust gas in a vehicle, it is desirable to place it in the exhaust gas purifier of the vehicle shown in FIG. 5. FIG. 5 is a section view schematically showing an example of the exhaust gas purifier of the vehicle with the honeycomb structural body (honeycomb filter) of the invention.

The exhaust gas purifier 600 essentially comprises a honeycomb filter 60 according to the invention, a casing 630 covering the outside of the honeycomb filter 60, a holding seal material 620 disposed between the honeycomb filter 60 and the casing 630 and a heating means 610 disposed at the exhaust gas inflow side of the honeycomb filter 60. To an end portion of the casing 630 located at a side of introducing the exhaust gas is connected an inlet pipe 640 connected to an internal combustion engine such as an engine or the like, and the other end portion of the casing 630 is connected to an outlet pipe 650 connected to an exterior. Moreover, an arrow in FIG. 5 shows the flow of the exhaust gas.

In FIG. 5, the structure of the honeycomb filter 60 may be the same as that of the honeycomb structural body 10 shown in FIG. 1 or as that of the honeycomb structural body 30 shown in FIG. 3.

In the thus constructed exhaust gas purifier 600, the exhaust gas discharged from the internal combustion engine such as engine or the like is introduced into the casing 630 through the inlet pipe 640, and passes from the through-holes of the honeycomb filter 60 through wall portion (partitions) to catch particulates with the wall portion (partitions) to thereby conduct purification, and discharged through the outlet pipe 650 to an exterior.

When a large amount of particulates are accumulated on the wall portion (partitions) of the honeycomb filter 60 to increase pressure loss, the honeycomb filter is subjected to regeneration treatment.

In this regeneration treatment, a gas heated by using the heating means 610 is flowed into the interiors of the through-holes in the honeycomb filter 60 to heat the honeycomb filter 60, whereby the particulates accumulated in the wall portion (partitions) are burnt and removed.

Also, the particulates may be burnt and removed by using a post injection system.

Moreover, when a catalyst such as Pt or the like for accelerating combustion of particulates is carried on the wall portion (partitions) of the honeycomb filter 60, the combustion temperature of the particulate lowers, and hence the heating temperature of the honeycomb filter 60 by the heating means 610 can be lowered.

The ceramic structural body according to the invention is explained by referring to concrete examples in detail hereinafter, but the invention is not limited to these examples.

EXAMPLES

Example 1

Example 1 prepares three kinds of ceramic porous bodies having different sectional shapes of through-holes (B1-B3) shown in FIGS. 4(*a*)-(*c*) by the following method (B) using a raw material paste A1 prepared by the following method (A) and consisting essentially of silicon carbide powder and monocrystal silicon powder, and prepares three kinds of assembly type honeycomb structures bundling a plurality of these ceramic porous bodies through sealing material layers as Examples 1.1-1.3.

Figure 13:
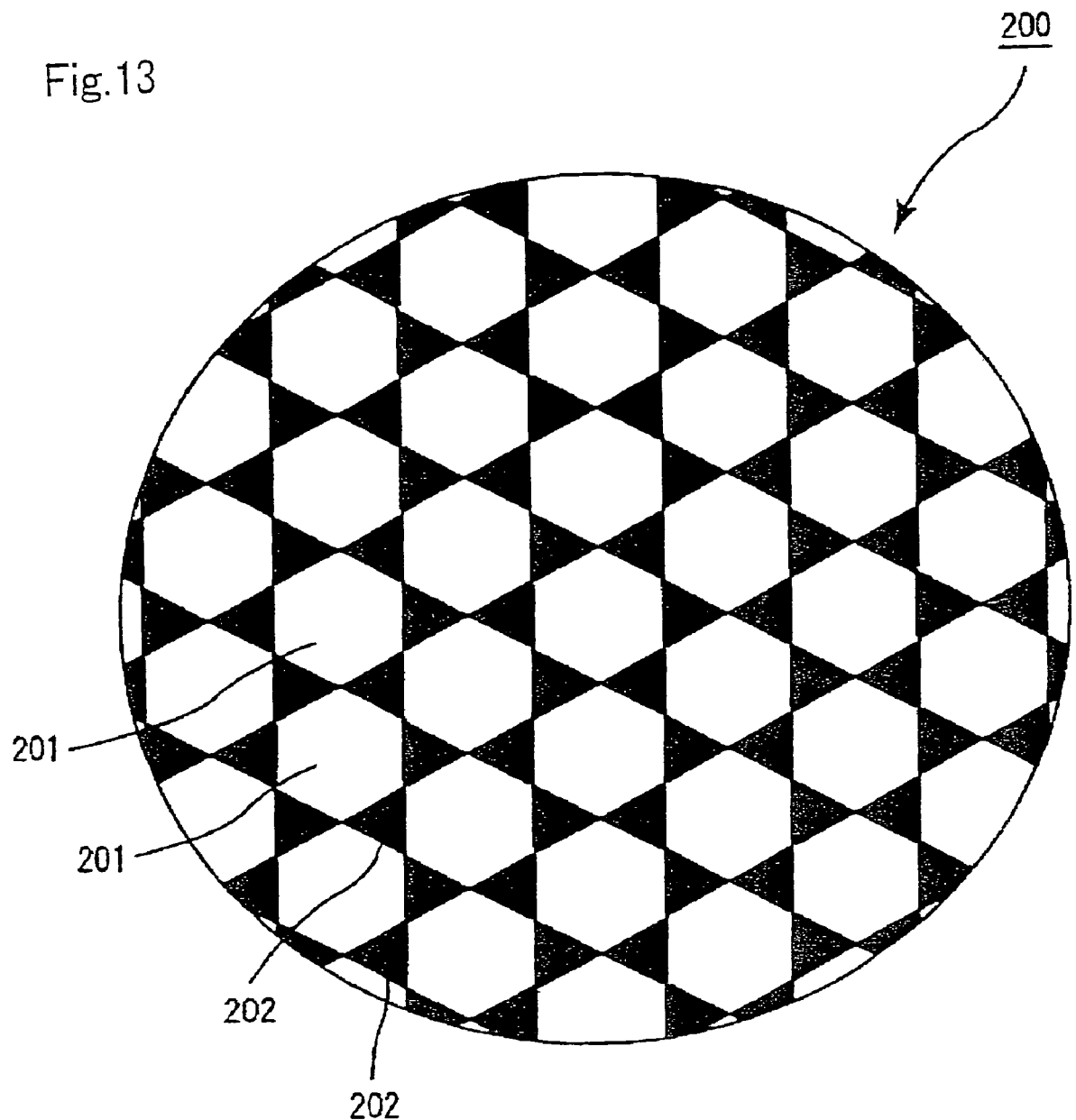
FIG. 13 is a cross-sectional view schematically showing another example of the conventional honeycomb filter.
Figure 14:
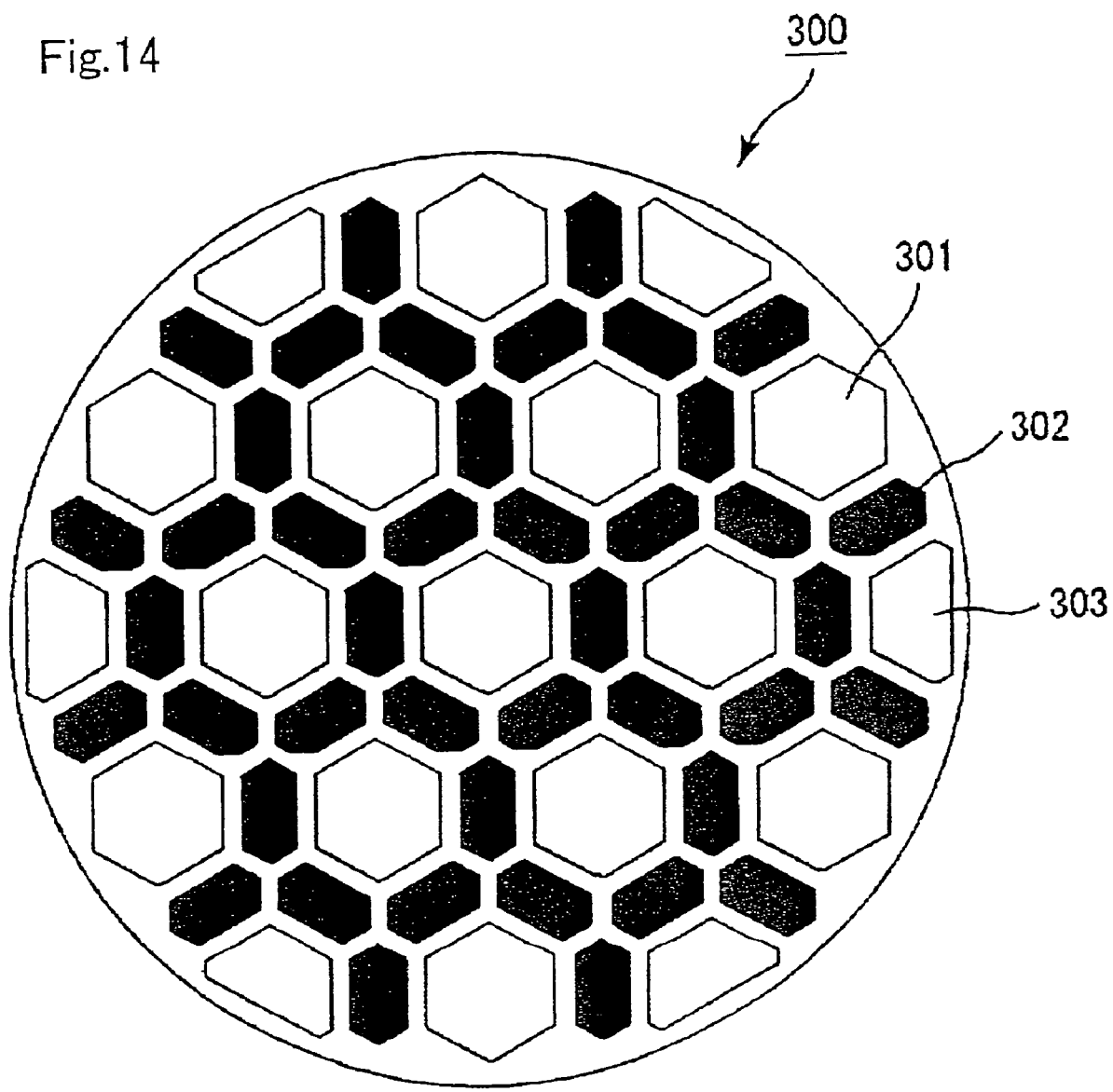
FIG. 14 is a cross-sectional view schematically showing the other example of the conventional honeycomb filter.
Figure 15:
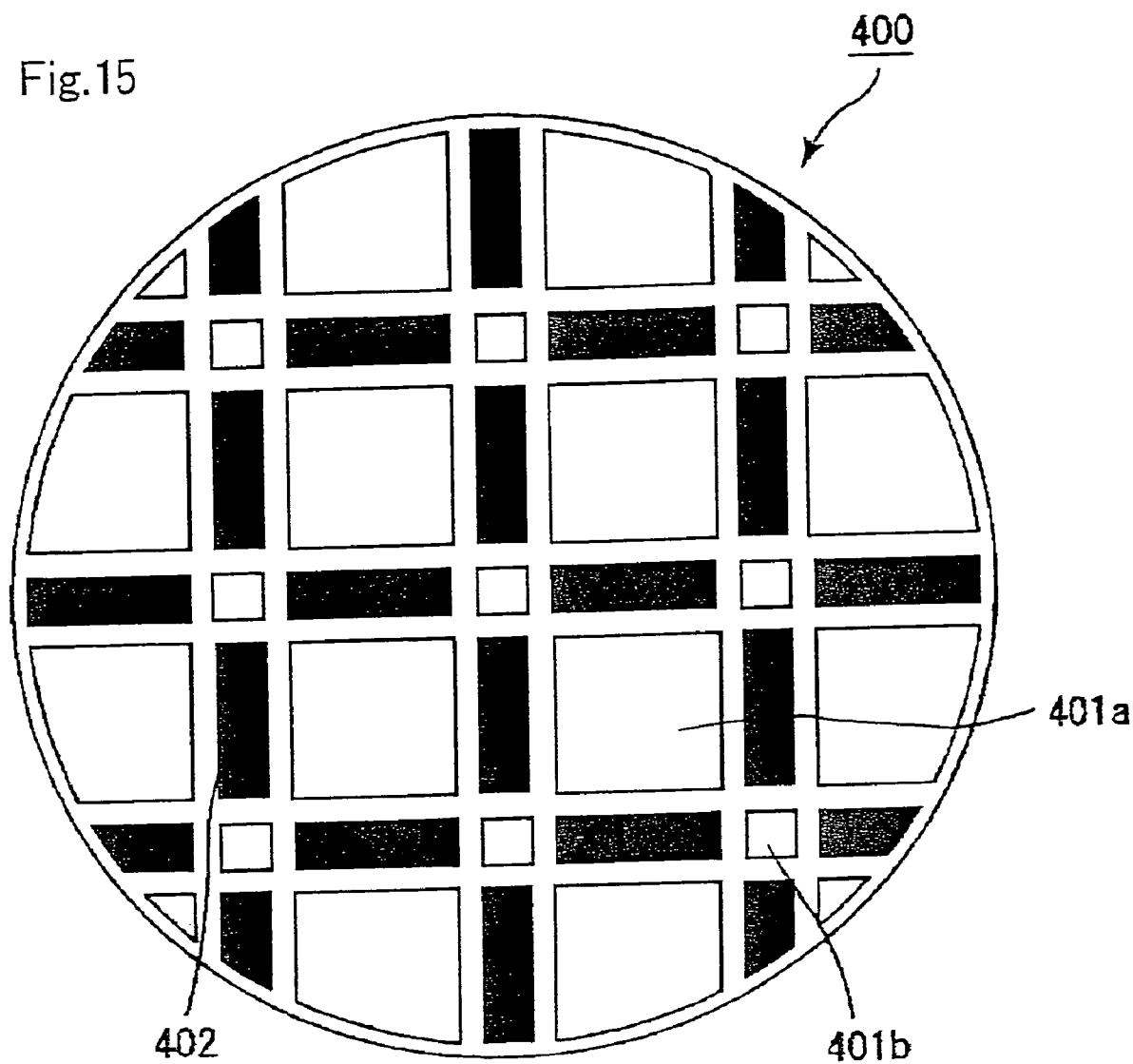
FIG. 15 is a cross-sectional view schematically showing a further example of the conventional honeycomb filter.

Also, there are prepared three kinds of ceramic blocks having different sectional shapes of through-holes (B4-B-6) as shown in FIGS. 13, 14 and 15 using the raw material paste A1, and prepared three kinds of integral type honeycomb structures from these ceramic blocks as Examples 1.4-1.6. A concrete explanation is made below.

(A) Preparation of Raw Material Paste A1

A raw material paste is prepared by mixing 80 wt % of α-type silicon carbide powder having a mean particle size of 30 μm and 20 wt % of monocrystal silicon powder having a mean particle size of 4 μm and adding and kneading with 6 parts by weight of an organic binder (methyl cellulose), 2.5 parts by weight of a surfactant (oleic acid) and 24 parts by weight of water based on 100 parts by weight of the thus obtained mixed powder as the raw material paste A1.

(B) Preparation of assembly type honeycomb structural body (1) The raw material paste A1 prepared in the item (A) is filled in an extruder and extruded at an extrusion rate of 10 cm/min to prepare a green ceramic porous body.

Moreover, in the extrusion molding, three kinds of green ceramic porous bodies having different through-hole sectional shapes are prepared by changing a metallic die arranged on a top end portion of the extruder.

(2) Three kinds of the above green ceramic porous bodies prepared in the item (1) are dried by using a microwave drier to form ceramic dried bodies, and thereafter a plugging material paste having the same composition as in the ceramic porous body is filled in predetermined through-holes and again dried with the use of the drier and then degreased under an oxidizing atmosphere at 550° C. for 3 hours to obtain three kinds of ceramic degreased bodies.

(3) Each of the ceramic degreased bodies obtained in the item (2) is heated in an argon atmosphere under conditions of 1400° C. and 2 hours to melt monocrystal silicon to thereby bond silicon carbide particles with silicon.

(4) Thereafter, the above silicon is crystallized by subjecting to a firing treatment in an argon atmosphere of normal pressure at 2150° C. for 2 hours to prepare three kinds (B1-B3) of porous ceramic members having a porosity of 45%, a mean pore size of 10 μm, a size of 34.3 mm×34.3 mm×150 mm and through-hole sectional shapes shown in FIGS. 4(a)-4(c).

(5) There is prepared a heat resistant sealing material paste containing 30 wt % of alumina fibers having a fiber length of 0.2 mm, 21 wt % of silicon carbide powder having a mean particle size of 0.6 μm, 15 wt % of silica sol, 5.6 wt % of carboxy methyl cellulose and 28.4 wt % of water.

(6) A plurality of porous ceramic members of the same kind obtained in the item (4) are bundled with the use of the sealing material paste prepared in the item (5), and cut with a cutter to prepare three kinds of cylindrical ceramic blocks having a diameter of 140 mm and different through-hole sectional shapes (B1-B3).

In this case, a thickness of the sealing material layer for bundling the porous ceramic members is adjusted to 1.0 mm.

(7) Then, a sealing material paste is prepared by mixing and kneading 23.3 wt % of ceramic fibers made of alumina silicate (shot content: 3%, fiber length: 0.1-100 mm) as an inorganic fiber, 30.2 wt % of silicon carbide powder having a mean particle size of 0.3 μm as inorganic particles, 7 wt % of silica sol ($SiO_2$ content in sol: 30 wt %) as an inorganic binder, 0.5 wt % of carboxyl methyl cellulose as an organic binder and 39 wt % of water.

(8) A sealing material paste layer having a thickness of 1.0 mm is formed on an outer peripheral surface of each of the three cylindrical ceramic blocks obtained in the item (6) by using the sealing material paste prepared in the item (7), and thereafter the sealing material paste layer is dried at 120° C. to prepare three kinds of cylindrical honeycomb structural bodies functioning as a honeycomb filter for purifying an exhaust gas.

(C) Preparation of Integral Type Honeycomb Structural Body (1) The extrusion molding is carried out by using the raw material paste A1 consisting essentially of ceramic particles and silicon prepared in the item (A) to prepare ceramic shaped bodies having substantially the same shape as those of honeycomb structural bodies having through-hole sectional shapes (B4-B6) as shown in FIGS. 13, 14 and 15.

(2) There are prepared three kinds (B4-B6) of ceramic blocks having a porosity of 45%, a mean pore size of 10 μm, a size of 34.3 mm×34.3 mm×150 mm and through-hole sectional shapes shown in FIGS. 13, 14 and 15 by substantially the same treatments as the steps (2)-(4) in the item (B).

(3) After a sealing material paste layer having a thickness of 1.0 mm is formed on an outer peripheral surface of each of the three kinds of cylindrical ceramic blocks obtained in the item (2) by using the sealing material paste prepared in the step (7) of the item (B), the sealing material paste layer is dried at 120° C. to prepare three kinds of cylindrical honeycomb structural bodies functioning as a honeycomb structural body for purifying an exhaust gas.

Moreover, the through-hole sectional shapes B1-B6 of the honeycomb structural bodies according to Examples 1.1-1.6 are explained below.

B1 is a through-hole sectional shape of the porous ceramic member 20 forming the assembly type honeycomb structural body shown in FIG. 4(a). Concretely, the number of through-holes is 289 and the thickness of the partition 23 is 0.4 mm, in which only the large volume through-holes are plugged at one end faces with the plugging material, and only the small volume through-holes are plugged at the other end faces with the plugging material.

More concretely, the width in the section perpendicular to the longitudinal direction of the large volume through-hole 21a is 1.65 mm, and the width in the section of the small volume through-hole 21b is 1.33 mm, and the area ratio of the large volume through-holes 21a in the section perpendicular to the longitudinal direction of the porous ceramic member 20 is 38.2%, and that of the small volume through-hole is 24.6%.

In the porous ceramic member 20, the distance between gravity centers in sections of adjacent large volume through-holes 21a and that between the sections of adjacent small volume through-holes 21b are 2.68 mm, and the opening ratio is 1.55.

Similarly, B2 is a through-hole sectional shape of the porous ceramic member 40 forming the assembly type honeycomb structural body shown in FIG. 4(b), in which the thickness of the partition 43 is 0.4 mm, and the width in the section perpendicular to the longitudinal direction of the large volume through-hole 41a is 1.84 mm, and the width in the section perpendicular to the longitudinal direction of the small volume through-hole 41b is 1.14 mm, and the area ratio of the large volume through-hole in section perpendicular to the longitudinal direction of the porous ceramic member 40 is 46.0% and that of the small volume through-hole is 18.1%.

In the porous ceramic member 40 having the above B2, the distance between gravity centers in the sections of adjacent large volume through-holes 41a and that between the sections of adjacent small volume through-holes 41b are 2.72 mm. Also, the opening ratio is 2.54.

Similarly, B3 is a through-hole sectional shape of the porous ceramic member 50 forming the assembly type honeycomb structural body as shown in FIG. 4(c), in which the thickness of the partition 53 is 0.4 mm, and the width in the section perpendicular to the longitudinal direction of the large volume through-hole 51a is 2.05 mm, and the width in the section perpendicular to the longitudinal direction of the small volume through-hole 51b is 0.93 mm, and the area ratio of the large volume through-hole 51a in the section perpendicular to the longitudinal direction of the porous ceramic member 50 is 53.5%, and the area ratio of the small volume through-hole 51b is 12.0%.

In the porous ceramic member 50 according to the above B3, the distance between gravity centers in the sections of adjacent large volume through-hole 51a and the distance between gravity centers in the sections of adjacent small volume through-hole 51b are 2.79 mm. Also, the opening ratio is 4.45.

Similarly, B4 is a through-hole sectional shape of the porous ceramic member forming the integral type honeycomb structural body as shown in FIG. 13, in which the thickness of the partition of the porous ceramic member is 0.3 mm, and the width (distance between opposite sides) in the section perpendicular to the longitudinal direction of the large volume (hexagon) through-hole is 2.25 mm, and the width (perpendicular length from one top to the opposite side) in the section perpendicular to the longitudinal direction of the small volume (triangle) through-hole is 0.825 mm, and the area ratio of the large volume through-hole in the section perpendicular to the longitudinal direction of the porous ceramic member is 58.4%, and the area ratio of the small volume through-hole is 10.5%.

In the porous ceramic member according to the above B4, the distance between gravity centers in the sections of adjacent large volume through-hole is 2.60 mm, and the distance between gravity centers in the sections of adjacent small volume through-hole is 1.70 mm, and the opening ratio is 5.58.

Similarly, B5 is a through-hole sectional shape of the porous ceramic member basically forming the integral type honeycomb structural body as shown in FIG. 14, in which the thickness of the partition of the porous ceramic member is 0.4 mm, and the width (distance between opposite sides) in the section perpendicular to the longitudinal direction of the large volume through-hole is 3.0 mm, and the maximum width in the section perpendicular to the longitudinal direction of the small volume through-hole is 2.14, and the minimum width is 0.7 mm, and the area ratio of the large volume through-hole in the section perpendicular to the longitudinal direction of the porous ceramic member is 44.4%, and the area ratio of the small volume through-hole is 23.2%.

In the porous ceramic member according to the above B5, the distance between gravity centers in the sections of the adjacent large volume through-holes is 4.5 mm, and the distance between gravity centers in the sections of the adjacent small volume through-holes is 2.3 mm, and the opening ratio is 1.91.

Similarly, B6 is a through-hole sectional shape of the porous ceramic member 400 basically forming the integral honeycomb structural body as shown in FIG. 15, in which the porous ceramic member 400 is provided with a great number of through-holes arranged side by side in the longitudinal direction, and these through-holes comprises three kinds of a large volume through-hole 401a having a relatively large sectional area of a section perpendicular to the longitudinal direction, a small volume through-hole 401b having a relatively small sectional area of a section perpendicular to the longitudinal direction, a medium volume through-hole 402 having a sectional area smaller than the large volume through-hole 401a but larger than the small volume through-hole 401b, and the large volume through-hole 401a and small volume through-hole 401b having a sectional shape of substantially square are plugged with a plugging material at the end portions of the exhaust gas outlet sides of the filter 400, while the medium volume through-hole 402 having a rectangular cross section is plugged with a plugging material at the end portions of the exhaust gas inlet sides of the filter 400, and the exhaust gas flowed from the large volume through-hole 401a and the small volume through-hole 401b passes through the partitions 403 and then flows out of the medium volume through-hole 402, and the partition 403 functions as a filter.

The thickness of the partition 403 of the porous ceramic member according to B6 is 0.4 mm, and the width in the section perpendicular to the longitudinal direction of the large volume through-hole 401a is 2.36 mm, and the width in the section perpendicular to the longitudinal direction of the small volume through-hole 401b is 0.62 mm, and the maximum width in the section perpendicular to the longitudinal direction of the medium volume through-hole 402 is 2.36, and the minimum width thereof is 0.62 mm, and the area ratios of the large volume through-hole 401a and the small volume through-hole 401b in the section perpendicular to the longitudinal direction of the porous ceramic member are 41.0%, and the area ratio of the medium volume through-hole 402 is 20.0%.

That is, in the porous ceramic member 400 according to B6, the distance between gravity centers in the sections of adjacent large volume through-hole 401a and small volume through-hole 401b is 2.67 mm, and the distance between the gravity centers in sections of the medium volume through-holes 402 is 3.90 mm. Also, the opening ratio is 2.03.

Comparative Example 1

Three kinds of ceramic shaped bodies having through-hole cross sections (B4-B6) are prepared in the same manner as in Examples 1.4-1.6 except the use of raw material paste A2 essentially containing silicon carbide powder prepared by the following method (C), and three kinds of ceramic structural bodies are prepared from these ceramic shaped bodies as Comparative Examples 1.1-1.3.

(C) Raw Material Paste A2

A raw material paste is prepared by mixing 80 wt % of α-type silicon carbide powder having a mean particle size of 30 μm and 20 wt % of β-type silicon carbide powder having a mean particle size of 0.5 μm and added and kneading with 6 parts by weight of an organic binder (methyl cellulose), 2.5 parts by weight of a surfactant (oleic acid) and 24 parts by weight of water based on 100 parts by weight of the mixed powder.

With respect to the above Examples 1.1-1.6 and Comparative Examples 1.1-1.3, a test for resistance to thermal shock and a test for catching ash are made as follows.

(A) Evaluation of Resistance To Thermal Shock

The honeycomb structural bodies according to Examples 1.1-1.6 and Comparative Examples 1.1-1.3 are placed in an electric furnace and heated, and thereafter put in water of room temperature (20° C.) and cooled, whereby thermal shock is generated. In this case, if cracks are produced, sound is generated, so that the body generating such sound is observed by means of SEM to confirm the existence of crack and measure a temperature difference for producing the cracks. The results are shown in Table 1.

(B) Evaluation of Resistance to Thermal Shock

There is repeated an experiment that each of the honeycomb structural bodies according to Examples 1.1-1.6 and Comparative Examples 1.1-1.3 is placed in an exhaust gas purifier disposed in an engine exhaust passage as shown in FIG. 5, and the engine is operated at a revolution number of 3000 rpm and a torque of 50 Nm for a given time to catch particulates and then a regeneration treatment is conducted, whereby there is examined whether or not cracks are generated in the honeycomb structural body. And, an amount of particulates caught in case of generating cracks is made a catching limit (g/L). The results are shown in Table 1.

(C) Evaluation of Catching Ash

With respect to the honeycomb structural bodies according to Examples 1.1-1.6 and Comparative Examples 1.1-1.3, a test of catching ash up to the above catching limit and regenerating the body is repeated 500 cycles.

Thereafter, a filter is cut to observe a state of ash accumulation.

As the state of such ash accumulation, ash thickness is measured at two places in the vicinity of the inlet side end portion (from inlet end face to about 15 mm: accumulated amount α mm) and in the vicinity of the exhaust side end portion (from inlet end face to around 125 mm: accumulated amount β mm) in the porous ceramic member positioned at the central portion of the filter to measure α/β as an accumulated amount ratio of ash. The results are shown in Table 1.

TABLE 1

|  | Raw Material | Shape | (A)Thermal shock test(° C.) | (B)Catching limit(g/L) | (C)Accumulated amount ratio of ash |
|---|---|---|---|---|---|
| Example 1.1 | A1 | B1 FIG.4(a) | 70 | 10.5 | 0.54 |
| Example 1.2 | A1 | B2 FIG.4(b) | 68 | 9.7 | 0.53 |
| Example 1.3 | A1 | B3 FIG.4(c) | 65 | 9.2 | 0.55 |
| Example 1.4 | A1 | B4 FIG.13 | 40 | 6.6 | 0.7 |
| Example 1.5 | A1 | B5 FIG.14 | 45 | 7.2 | 0.6 |
| Example 1.6 | A1 | B6 FIG.15 | 45 | 7.3 | 0.7 |
| Comparative Example 1.1 | A2 | B4 FIG.13 | 35 | 4.0 | 0.8 |
| Comparative Example 1.2 | A2 | B5 FIG.14 | 40 | 6.5 | 0.8 |
| Comparative Example 1.3. | A2 | B6 FIG.15 | 35 | 7.5 | 0.9 |

As seen from the results of Table 1, when the honeycomb structural body is made from a silicon-silicon carbide composite formed by bonding silicon carbides as ceramic particles with silicon and used as a filter (Examples 1.1-1.6), the amount of particulates caught in the catching limit is larger than that of the filter made of only silicon carbide (Comparative Examples 1.1-1.3) and hence a period up to regeneration can be prolonged.

Moreover, FIGS. 6(a)-(c) are photographs showing the state of catching particulates observed at positions separated by 15 mm (a), 75 mm (b) and 125 mm (c), respectively, from the inlet of the honeycomb filter according to Example 1.1, from which it is found that the particulates are uniformly accumulated on the partitions of the large volume through-hole 31a as a whole.

Particularly, it is confirmed that the filters according to Examples 1.1-1.3 having the sectional shapes B1-B3 of the honeycomb structural body show extremely excellent effects in all of the thermal shock test, catching limit and accumulated amount ratio of ash as compared with the filters according to Comparative Examples 1.1-1.3 having the sectional shapes B4-B6 of the honeycomb structural body.

The filters according Examples 1.4-1.6 having the sectional shapes B4-B-6 of the honeycomb structural body only show slightly excellent effects in the thermal shock test, catching limit and accumulated amount ratio of ash as compared with the filters according to Comparative Examples 1.1-1.3 having the same sectional shapes.

It is found from these results that when the sectional shape of the porous ceramic member made of silicon-silicon carbide composite is B1-B3, more excellent action and effects are developed.

Example 2

On the assumption that the porous ceramic member is composed of silicon-silicon carbide composite by bonding silicon carbides with silicon in the same manner as in Examples 1.1-1.6, Example 2 prepares ceramic members having changes porosities as Examples 2.1-2.5.

Moreover, the shapes of the porous ceramic members in Examples 2.1-2.5 are fixed to the same shape as in the through-hole sectional shape B1 (FIG. 4(a)), and the material forming the member (raw material paste) is adjusted to prepare five kinds of different honeycomb structural bodies.

(1) At first, a raw material paste is prepared by mixing 80 wt % of α-type silicon carbide powder having a mean particle size of 20 μm as a raw material powder having a relatively large mean particle size (called as "powder A") and 20 wt % of monocrystal silicon powder having a mean particle size of 6 μm as a raw material powder having a relatively small mean particle size (called as "powder B") and adding and kneading with 6 parts by weight of methyl cellulose as a molding assistant, 2.5 parts by weight of oleic acid as a dispersion medium and 24 parts by weight water based on 100 parts by weight of the thus mixed powder.

(2) By using the raw material paste obtained in the item (1) are produced a porous ceramic member made of silicon-silicon carbide composite having a porosity of 30%, a mean pore size of 10 μm, a size of 34.3 mm×34.3 mm×150 mm and through-hole sectional shape of B1 shown in FIG. 4(a) in substantially the same treatment as in Example 1, (B) (1)-(4).

(3) Next, a cylindrical honeycomb structural body functioning as a honeycomb filter for purifying an exhaust gas is prepared by substantially the same treatments as in Example 1, (B) (5)-(8) as Example 2.1.

A porous ceramic member made of silicon-silicon carbide composite having a porosity of 45%, a mean pore diameter of 10 μm, a size of 34.3 mm×34.3 mm×150 mm and a through-hole sectional shape of B1 shown in FIG. 4(a) is prepared substantially in the same treatments as in Example 2.1 except the use of a raw material paste obtained by mixing 80 wt % of α-type silicon carbide powder having a mean particle size of 30 μm as powder A in the item (1) and 20 wt % of monocrystal silicon powder having a mean particle size of 4 μm ass powder B and adding and kneading with 6 parts by weight of methyl cellulose as a molding assistant, 2.5 parts by weight of oleic acid as a dispersion medium and 24 parts by weight of water, and an assembly type ceramic structural body is prepared by bundling a plurality of these members as Example 2.2.

Also, a porous ceramic member made of silicon-silicon carbide composite body having a porosity of 80%, a mean pore diameter of 10 μm, a size of 34.3 mm×34.3 mm×150 mm and a through-hole sectional shape of B1 shown in FIG. 4(a) is prepared in the same manner as in Example 2.2 except the use of a raw material paste made by mixing 5 vol % of acrylic resin particles (density: 1.1 g/cm$^3$) (called as "powder C") as a pore forming material having a mean particle size of 11 μm and an aspect ratio of 1 in addition to α-type silicon carbide powder and monocrystal silicon powder in Example 2.2, and then an assembly type ceramic structural body is prepared by bundling a plurality of these members as Example 2.3.

Further, a porous ceramic member made of silicon-silicon carbide composite body having a porosity of 25%, a mean pore diameter of 10 µm, a size of 34.3 mm×34.3 mm×150 mm and a through-hole sectional shape of B1 shown in FIG. 4(a) is prepared in the same manner as in Example 2.1 except the use of a raw material paste made by mixing 80 wt % of α-type silicon carbide powder having a mean particle diameter of 10 µm as the powder A and 20 wt % of monocrystal silicon powder having a mean particle diameter of 6 µm as the powder B and adding and kneading with 3 parts by weight of methyl cellulose as a molding assistant, 2.5 parts by weight of oleic acid as a dispersion medium and 24 parts by weight of water based on 100 parts by weight of the thus obtained mixed powder, and then an assembly type ceramic structural body is prepared by bundling a plurality of these members as Example 2.4.

Furthermore, a porous ceramic member made of silicon-silicon carbide composite body having a porosity of 85%, a mean pore diameter of 10 µm, a size of 34.3 mm×34.3 mm×150 mm and a through-hole cross sectional shape of B1 shown in FIG. 4(a) is prepared in the same manner as in Example 2.3 except the use of a raw material paste made by adding and kneading with 15 parts by weight of methyl cellulose as a molding assistant, 2.5 parts by weight of oleic acid as a dispersion medium and 24 parts by weight of water based on 100 parts by weight of the mixed powder in Example 2.3 containing 20 vol % of acrylic resin particle (density: 1.1 g/cm³) as a pore forming material having a mean particle diameter of 11 µm and an aspect ratio of 1, and then an assembly type ceramic structural body is prepared by bundling a plurality of these members as Example 2.5.

With respect to Examples 2.1-2.5, the tests (A), (B) for resistance to thermal shock and the ash catching test (C) are conducted in the same manner as in Example 1. The test results are shown in Table 2.

TABLE 2

| | Powder A | Powder B | Powder C | Molding assistant | Dispersion medium | Firing condition | Fired body | Thermal shock test (° C.) | Catching limit (g/L) | Accumulated amount ratio of ash |
|---|---|---|---|---|---|---|---|---|---|---|
| Example 2.1 | α-SiC mean particle size 20 µm 80 wt % 100 wt parts | mono-crystal-Si mean particle size 6 µm 20 wt % | | methyl cellulose 6 wt parts | oleic acid 2.5 wt parts water 24 wt parts 26.5 wt parts | 1400° C. 2 hours 2150° C. 2 hours | mean pore size 10 µm porosity 30% | 75 | 11.5 | 0.65 |
| Example 2.2 | α-SiC mean particle size 30 µm 80 wt % 100 wt parts | mono-crystal-Si mean particle size 4 µm 20 wt % | | methyl cellulose 6 wt parts | oleic acid 2.5 wt parts water 24 wt parts 26.5 wt parts | 1400° C. 2 hours 2150° C. 2 hours | mean pore size 10 µm porosity 45% | 70 | 10.5 | 0.54 |
| Example 2.3 | α-SiC mean particle size 30 µm 80 wt % 100 wt parts | mono-crystal-Si mean particle size 4 µm 20 wt % | acryl mean particle size 11 µm aspect ratio 1 15 vol % (C/A + B + C) | methyl cellulose 10 wt parts | oleic acid 5 wt parts water 40 wt parts 45 wt parts | 1400° C. 2 hours 2150° C. 2 hours | mean pore size 10 µm porosity 80% | 65 | 9.5 | 0.6 |
| Example 2.4 | α-SiC mean particle size 10 µm 80 wt % 100 wt parts | mono-crystal-Si mean particle size 6 µm 20 wt % | | methyl cellulose 3 wt parts | oleic acid 2.5 wt parts water 24 wt parts 26.5 wt parts | 1400° C. 2 hours 2150° C. 2 hours | mean pore size 10 µm porosity 25% | 78 | 12 | 0.73 |
| Example 2.5 | α-SiC mean particle size 30 µm 80 wt % 100 wt parts | mono-crystal-Si mean particle size 4 µm 20 wt % | acryl mean particle size 11 µm aspect ratio 1 20 vol % (C/A + B + C) | methyl cellulose 15 wt parts | oleic acid 5 wt parts water 45 wt parts 50 wt parts | 1400° C. 2 hours 2150° C. 2 hours | mean pore size 10 µm porosity 85% | 60 | 9.2 | 0.68 |

As seen from the results shown in Table 2, when the honeycomb structural body is made from the silicon-silicon carbide composite body formed by bonding silicon carbide as ceramic particles with silicon and used as a filter, in the examples in which the porosity of the porous ceramic member is less than 30% and exceeds 80%, the peeling of ash is worse, and further ash is accumulated on the wall portion near to the central portion from the exhaust side of the filter.

That is, when the porosity is within a range of 30-80%, the peeling of ash is favorable, and further ash is accumulated much more at the wall portion near to the exhaust side of the filter, and it is found that the pressure loss can be lowered.

Example 3

Example 3 prepares porous ceramic members by changing a surface roughness (Ra) of a partition on the assumption that the porous ceramic member is made of silicon-silicon carbide composite body formed by bonding silicon carbides with silicon likewise Example 2, and prepares an assembly type ceramic structural body made by bundling a plurality of these members as Examples 3.1-3.7.

Moreover, 7 kinds of different honeycomb structural bodies are prepared by fixing through-hole sectional shapes of the porous ceramic members in Examples 3.1-3.7 to the same shapes as B1 (FIG. 4(a)) likewise Example 2, and adjusting the aspect ratio of the material forming the member (raw material paste), particularly acrylic resin particles and/or the surface roughness of the die.

(1) At first, a raw material paste is prepared by mixing 5 vol % of acrylic resin particles (density: 1.1 g/cm$^3$) as a pore forming material having a mean particle size of 11 μm and an aspect ratio of 1 with 80 wt % of α-type silicon carbide powder having a mean particle size of 10 μm and 20 wt % of monocrystal silicon powder having a mean particle size of 4 μm, and adding and kneading with 6 parts by weight of methyl cellulose as a molding assistant, 2.5 parts by weight of oleic acid as a dispersion medium and 24 parts by weight of water based on 100 parts by weight of the thus obtained mixed powder.

(2) The raw material paste prepared in the item (1) is filled in an extruder and extruded at extrusion rate of 10 cm/min to prepare a green ceramic porous body.

Moreover, in the extrusion molding, the roughness Ra of the slit surface in the metallic die arranged at the end portion of the extruder is previously processed to 0.1 μm.

(3) Next, a porous ceramic member made of silicon-silicon carbide composite body having a porosity of 45%, a mean pore diameter of 10 μm, a surface roughness (Ra) of through-hole inner wall of 1.0 μm, a size of 34.3 mm×34.3 mm×150 mm and a through-hole sectional shape of B1 as shown in FIG. 4(a) is prepared by substantially the same treatments as in Example 1, (B) (2)-(8), and an assembly type cylindrical honeycomb structural body functioning as a honeycomb filter for purifying exhaust gas is prepared by bundling a plurality of these members as Example 3.1.

A porous ceramic member made of silicon-silicon carbide composite body having a porosity of 45%, a mean pore diameter of 10 μm, a surface roughness (Ra) of through-hole inner wall of 5.0 μm, a size of 34.3 mm×34.3 mm×150 mm and a through-hole sectional shape of B1 as shown in FIG. 4(a) is prepared by the same treatments as in Example 3.1 except that the roughness Ra of the slit surface is previously processed to 1 μm in the step (2) of Example 3.1, and an assembly type cylindrical honeycomb structural body functioning as a honeycomb filter for purifying an exhaust gas is prepared by bundling a plurality of these members as Example 3.2.

A porous ceramic member made of silicon-silicon carbide composite body having a porosity of 45%, a mean pore diameter of 10 μm, a surface roughness (Ra) of through-hole inner wall of 10.0 μm, a size of 34.3 mm×34.3 mm×150 mm and a through-hole sectional shape of B1 as shown in FIG. 4(a) is prepared by the same treatments as in Example 3.1 except that the aspect ratio of acrylic resin particle is made 1.3 in the step (1) of Example 3.1 and the roughness Ra of the slit surface is previously processed to 5 μm in the step (2), and an assembly type cylindrical honeycomb structural body functioning as a honeycomb filter for purifying an exhaust gas is prepared by bundling a plurality of these members as Example 3.3.

Also, a porous ceramic member made of silicon-silicon carbide composite body having a porosity of 45%, a mean pore diameter of 10 μm, a surface roughness (Ra) of through-hole inner wall of 20.0 mm, a size of 34.3 mm×34.3 mm×150 mm and a through-hole sectional shape of B1 as shown in FIG. 4(a) is prepared by the same treatment as in Example 3.1 except that the aspect ratio of acrylic resin particle is made 1.5 in the step (1) of Example 3.1 and the roughness Ra of the slit surface is previously processed to 15 μm in the step (2), and an assembly type cylindrical honeycomb structural body functioning as a honeycomb filter for purifying an exhaust gas is prepared by bundling a plurality of these porous ceramic members as Example 3.4.

A porous ceramic member made of silicon-silicon carbide composite body having a porosity of 45%, a mean pore diameter of 10 μm, a surface roughness (Ra) of through-hole inner wall of 30.0 μm, a size of 34.3 mm×34.3 mm×150 mm and a through-hole sectional shape of B1 as shown in FIG. 4(a) is prepared by the same treatment as in Example 3.1 except that the aspect ratio of acrylic resin particle is made 2.0 in the step (1) of Example 3.1 and the roughness Ra of the slit surface is previously processed to 20 μm in the step (2), and an assembly type cylindrical honeycomb structural body functioning as a honeycomb filter for purifying an exhaust gas is prepared by bundling a plurality of these members as Example 3.5.

Furthermore, a porous ceramic member made of silicon-silicon carbide composite body having a porosity of 45%, a mean pore diameter of 10 μm, a surface roughness (Ra) of through-hole inner wall of 0.5 μm, a size of 34.3 mm×34.3 mm×150 mm and a through-hole sectional shape of B1 as shown in FIG. 4(a) is prepared by the same treatment as in Example 3.1 except that acrylic resin particles as the pore forming material are not compounded in raw material paste in the step (1) of Example 3.1 and the roughness Ra of the slit surface is previously processed to 0.1 μm in the step (2), and an assembly type cylindrical honeycomb structural body functioning as a filter for purifying an exhaust gas is prepared by bundling a plurality of these members as Example 3.6.

Further, a porous ceramic member made of silicon-silicon carbide composite body having a porosity of 45%, a mean pore diameter of 10 μm, a surface roughness (Ra) of through-hole inner wall of 35.0 μm, a size of 34.3 mm×34.3 mm×150 mm and a through-hole sectional shape of B1 as shown in FIG. 4(a) is prepared by the same treatment as in Example 3.1 except that the aspect ratio of acrylic resin particle is 2.5 in the step 81) of Example 3.1 and the roughness Ra of the slit surface is previously processed to 30 μm in the step (2), and an assembly type cylindrical honeycomb structural body functioning as a filter for purifying an exhaust gas is prepared by bundling a plurality of these porous ceramic members as Example 3.7.

With respect to Examples 3.1-3.7, the tests (A), (B) for the resistance to thermal shock and the ash catching test (C) are conducted in the same manner as in Example 1. The test results are shown in Table 3.

Figure 7:
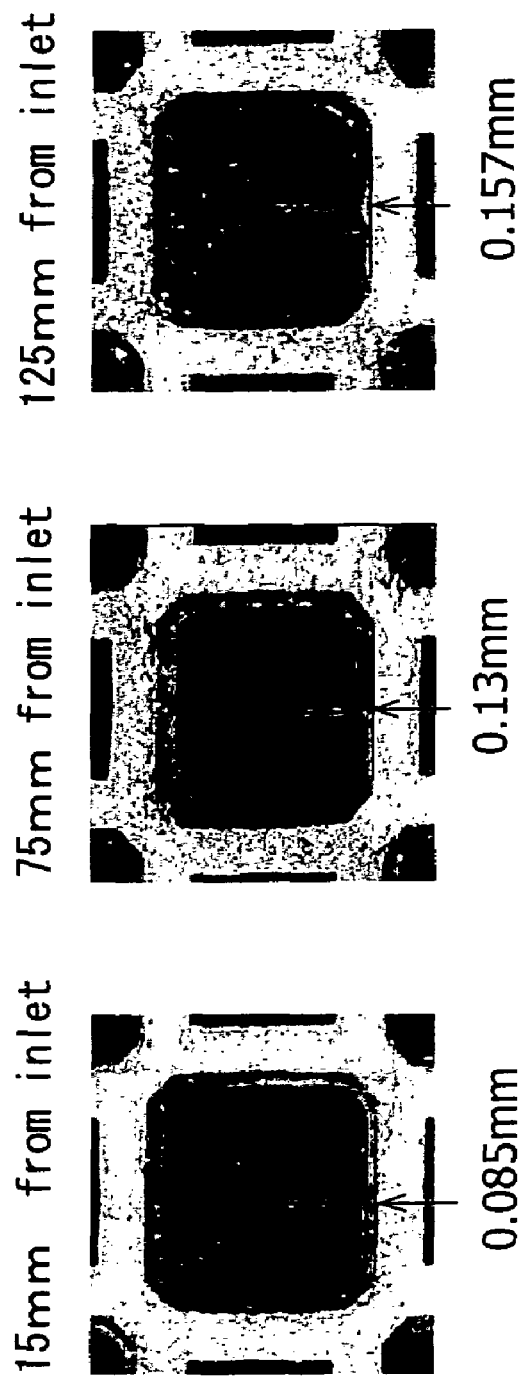
FIG. 7 is a photograph showing a state of catching ash by the honeycomb filter of Example 3.1.
Figure 8:
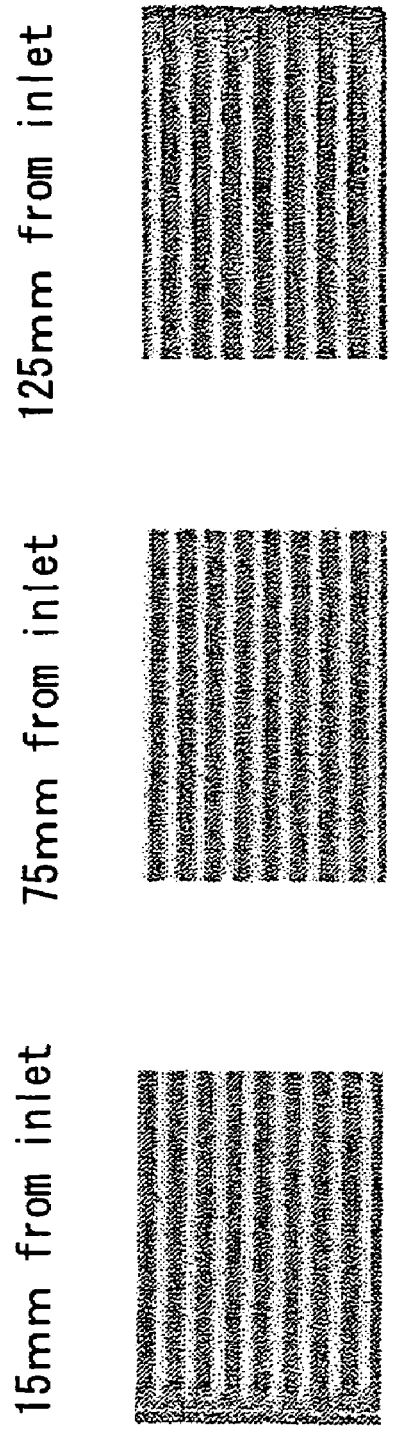
FIG. 8 is a photograph showing a state of catching ash by the honeycomb filter of Comparative Example 1.3.

Moreover, with respect to Example 3.1 (porosity: 45%) and Comparative Example 1.3 (porosity: 45%), photographs showing states of accumulating ash are shown in FIG. 7 and FIG. 8, respectively.

TABLE 3

| | Powder A (m.p.s: mean particle size) | Powder B (m.p.s: mean particle size) | Powder C (m.p.s: mean particle size) | Molding assistant | Dispersion medium (unit:parts by weight) | Shaping surface (Ra:roughness of mold condition | Firing condition | Fired body | Thermal shock test (°C.) | Catching limit (g/L) | Accumulated amount ratio of ash |
|---|---|---|---|---|---|---|---|---|---|---|---|
| Example 3.1 | α-SiC m.p.s. = 10 μm 80 wt % 100 wt parts | mono-crystal-Si m.p.s. = 4 μm 20 wt % | acryl m.p.s. = 11 μm aspect ratio 1 5 vol % (C/A + B + C) | methyl cellulose 6 wt parts | oleic acid 2.5 water 24 26.5 | Ra = 0.1 μm | 1400° C. 2 hours 2150° C. 2 hours | mean pore size 10 μm porosity 45% Ra = 1.0 μm | 70 | 10.5 | 0.54 |
| Example 3.2 | α-SiC m.p.s. = 10 μm 80 wt % 100 wt parts | mono-crystal-Si m.p.s. = 4 μm 20 wt % | acryl m.p.s. = 11 μm aspect ratio 1 5 vol % (C/A + B + C) | methyl cellulose 6 wt parts | oleic acid 2.5 water 24 26.5 | Ra = 1 μm | 1400° C. 2 hours 2150° C. 2 hours | mean pore size 10 μm porosity 45% Ra = 5.0 μm | 70 | 10.5 | 0.28 |
| Example 3.3 | α-SiC m.p.s. = 10 μm 80 wt % 100 wt parts | mono-crystal-Si m.p.s. = 4 μm 20 wt % | acryl m.p.s. = 11 μm aspect ratio 1.3 5 vol % (C/A + B + C) | methyl cellulose 6 wt parts | oleic acid 2.5 water 24 26.5 | Ra = 5 μm | 1400° C. 2 hours 2150° C. 2 hours | mean pore size 10 μm porosity 45% Ra = 10.0 μm | 70 | 10.5 | 0.14 |
| Example 3.4 | α-SiC m.p.s. = 10 μm 80 wt % 100 wt parts | mono-crystal-Si m.p.s. = 4 μm 20 wt % | acryl m.p.s. = 11 μm aspect ratio 1.5 5 vol % (C/A + B + C) | methyl cellulose 6 wt parts | oleic acid 2.5 water 24 26.5 | Ra = 15 μm | 1400° C. 2 hours 2150° C. 2 hours | mean pore size 10 μm porosity 45% Ra = 20.0 μm | 70 | 10.5 | 0.3 |
| Example 3.5 | α-SiC m.p.s. = 10 μm 80 wt % 100 wt parts | mono-crystal-Si m.p.s. = 4 μm 20 wt % | acryl m.p.s. = 11 μm aspect ratio 2 5 vol % (C/A + B + C) | methyl cellulose 6 wt parts | oleic acid 2.5 water 24 26.5 | Ra = 20 μm | 1400° C. 2 hours 2150° C. 2 hours | mean pore size 10 μm porosity 45% Ra = 30.0 μm | 70 | 10.5 | 0.46 |
| Example 3.6 | α-SiC m.p.s. = 10 μm 80 wt % 100 wt parts | mono-crystal-Si m.p.s. = 4 μm 20 wt % | | methyl cellulose 6 wt parts | oleic acid 2.5 water 24 26.5 | Ra = 0.1 μm | 1400° C. 2 hours 2150° C. 2 hours | mean pore size 10 μm porosity 45% Ra = 0.5 μm | 70 | 10.5 | 0.59 |
| Example 3.7 | α-SiC m.p.s. = 10 μm 80 wt % 100 wt parts | mono-crystal-Si m.p.s. = 4 μm 20 wt % | acryl m.p.s. = 11 μm aspect ratio 2.5 5 vol % (C/A + B + C) | methyl cellulose 6 wt parts | oleic acid 2.5 water 24 26.5 | Ra = 30 μm | 1400° C. 2 hours 2150° C. 2 hours | mean pore size 10 μm porosity 45% Ra = 35.0 μm | 70 | 10.5 | 0.64 |

As seen from the results shown in Table 3, when the honeycomb structural body is made from the silicon-silicon carbide composite body formed by bonding silicon carbides as ceramic particles with silicon and used as a filter, in the examples where the surface roughness Ra of the partition in the porous ceramic member is less than 1.0 μm or exceeds 30 μm, it is confirmed that the ash peeling is worse, and the ash is accumulated on the wall portion near the central portion from the filter exhaust side.

That is, when the surface roughness Ra of the partition is within a range of 1.0-30 μm, it is confirmed that the ash peeling is favorable and the ash is much accumulated on the wall portion near the exhaust side of the filter.

In fact, as shown in FIG. 7 and FIG. 8, it is found that ash is much accumulated near the exhaust side in Example 3.1 having a porosity of 45% as compared with Comparative Example 1.3 having a porosity of 45%.

Example 4

Example 4 prepares a porous ceramic member having a changed thickness of a partition on the assumption that the porous ceramic member is made of silicon-silicon carbide composite formed by bonding silicon carbide with silicon likewise Example 2, and then prepares an integral type ceramic structural bodies by bundling a plurality of these members as Examples 4.1-4.7.

Moreover, 7 kinds of different honeycomb structural bodies are prepared by fixing through-hole sectional shapes of the porous ceramic members in Examples 4.1-4.7 to the same shapes as B1 (FIG. 4(a)) likewise Example 2.2, and changing slit width or slit shape of an extruder for filling a raw material paste.

(1) At first, a raw material paste is prepared by mixing 80 wt % of α-type silicon carbide powder having a mean particle size of 30 µm and 20 wt % of monocrystal silicon powder having a mean particle size of 4 µm and adding and kneading with 6 parts by weight of methyl cellulose as a molding assistant, 2.5 parts by weight of oleic acid as a dispersion medium and 24 parts by weight of water based on 100 parts by weight of the thus obtained mixed powder.

(2) The raw material paste prepared in the item (1) is filled in an extruder and extruded at an extrusion rate of 10 cm/min by adjusting the slit width or slit shape of the extruder so that the thickness of the partition of the through-hole after firing is made 0.15 mm, 0.2 mm, 0.3 mm, 0.4 mm, 0.45 mm, 0.5 mm and 0.1 mm, respectively, to prepare 7 kinds of green ceramic porous bodies.

(3) Then, 7 kinds of porous ceramic members made of silicon-silicon carbide compound body having a porosity of 45%, a mean pore diameter of 10 µm, thicknesses of partition for the through-hole of 0.15 mm, 0.2 mm, 0.3 mm, 0.4 mm, 0.45 mm, 0.5 mm and 0.1 mm, respectively, a size of 34.3 mm×34.3 mm×150 mm and a through-hole sectional shape of B1 as shown in FIG. 4(a) are prepared by substantially the same treatment as in Example 1, (B)(2)-(8), and assembly type cylindrical honeycomb structural bodies functioning as a honeycomb filter for purifying an exhaust gas are prepared by bundling a plurality of these porous ceramic members as Examples 4.1-4.7.

With respect to Examples 4.1-4.7, the tests (A), (B) for the resistance to thermal shock and the ash catching test (C) are conducted in the same manner as in Example 1. The test results are shown in Table 4.

TABLE 4

| | Powder A (m.p.s: mean particle size) | Powder B (m.p.s.: mean particle size) | Molding assistant | Dispersion medium (unit:parts by weight) | Firing condition | Fired body | Thermal shock test (° C.) | Catching limit (g/L) | Accumulated amount ratio of ash |
|---|---|---|---|---|---|---|---|---|---|
| Example 4.1 | α-SiC m.p.s. = 30 µm 80 wt % | mono-crystal-Si m.p.s. = 4 µm 20 wt % | methyl cellulose | oleic acid 2.5 water 24 | 1400° C. 2 hours 2150° C. | mean pore size 10 µm porosity 45% Wall thickness = 0.15 mm | 65 | 9.6 | 0.44 |
| | 100 wt parts | | 6 wt parts | 26.5 | 2 hours | | | | |
| Example 4.2 | α-SiC m.p.s. = 30 µm 80 wt % | mono-crystal-Si m.p.s. = 4 µm 20 wt % | methyl cellulose | oleic acid 2.5 water 24 | 1400° C. 2 hours 2150° C. | mean pore size 10 µm porosity 45% Wall thickness = 0.2 mm | 67 | 9.8 | 0.24 |
| | 100 wt parts | | 6 wt parts | 26.5 | 2 hours | | | | |
| Example 4.3 | α-SiC m.p.s. = 30 µm 80 wt % | mono-crystal-Si m.p.s. = 4 µm 20 wt % | methyl cellulose | oleic acid 2.5 water 24 | 1400° C. 2 hours 2150° C. | mean pore size 10 µm porosity 45% Wall thickness = 0.3 mm | 68 | 10.2 | 0.32 |
| | 100 wt parts | | 6 wt parts | 26.5 | 2 hours | | | | |
| Example 4.4 | α-SiC m.p.s. = 30 µm 80 wt % | mono-crystal-Si m.p.s. = 4 µm 20 wt % | methyl cellulose | oleic acid 2.5 water 24 | 1400° C. 2 hours 2150° C. | mean pore size 10 µm porosity 45% Wall thickness = 0.4 mm | 70 | 10.5 | 0.54 |
| | 100 wt parts | | 6 wt parts | 26.5 | 2 hours | | | | |
| Example 4.5 | α-SiC m.p.s. = 30 µm 80 wt % | mono-crystal-Si m.p.s. = 4 µm 20 wt % | methyl cellulose | oleic acid 2.5 water 24 | 1400° C. 2 hours 2150° C. | mean pore size 10 µm porosity 45% Wall thickness = 0.45 mm | 73 | 10.8 | 0.52 |

TABLE 4-continued

| | Powder A (m.p.s: mean particle size) | Powder B (m.p.s.: mean particle size) | Molding assistant | Dispersion medium (unit:parts by weight) | Firing condition | Fired body | Thermal shock test (° C.) | Catching limit (g/L) | Accumulated amount ratio of ash |
|---|---|---|---|---|---|---|---|---|---|
| | | 100 wt parts | 6 wt parts | 26.5 | 2 hours | | | | |
| Example 4.6 | α-SiC m.p.s. = 30 μm 80 wt % | mono-crystal-Si m.p.s. = 4 μm 20 wt % | methyl cellulose | oleic acid 2.5 water 24 | 1400° C. 2 hours 2150° C. | mean pore size 10 μm porosity 45% Wall thickness = 0.5 mm | 75 | 11.3 | 0.6 |
| | | 100 wt parts | 6 wt parts | 26.5 | 2 hours | | | | |
| Example 4.7 | α-SiC m.p.s. = 30 μm 80 wt % | mono-crystal-Si m.p.s. = 4 μm 20 wt % | methyl cellulose | oleic acid 2.5 water 24 | 1400° C. 2 hours 2150° C. | mean pore size 10 μm porosity 45% Wall thickness = 0.1 mm | 62 | 9.5 | 0.66 |
| | | 100 wt parts | 6 wt parts | 26.5 | 2 hours | | | | |

As seen from the results shown in Table 4, when the honeycomb structural body is made from the silicon-silicon carbide composite body formed by bonding silicon carbide as ceramic particles with silicon and used as a filter, it is confirmed that in the examples in which the thickness of the partition in the porous ceramic member is less than 0.15 mm or exceeds 0.45 mm, the ash peeling is worse and the ash is accumulated on the wall portion near the central portion from the exhaust side of the filter.

That is, when the thickness of the partition is within a range of 0.15-0.45 mm, it is confirmed that the ash peeling is favorable, and the ash is much accumulated on the wall portion near the exhaust side of the filter.

Example 5

Example 5 prepares a ceramic member made from silicon particles of monocrystal silicon, amorphous silicon or metal silicon on the assumption that the porous ceramic member is made of silicon-silicon carbide compound body formed by bonding silicon carbides with silicon likewise Example 2.2 as Examples 5.1-5.8.

Moreover, 8 kinds of honeycomb structural bodies having different crystallinities of silicon are prepared by fixing a shape of the porous ceramic members in Examples 5.1-5.8 to the same through-hole sectional shape as B1 (FIG. 4(a)), forming silicon particles from either one of monocrystal silicon, amorphous silicon and metal silicon, and adjusting the firing conditions (temperature, time).

(1) At first, a raw material paste is prepared by mixing 80 wt % of α-type silicon carbide powder having a mean particle size of 30 μm and 20 wt % of monocrystal silicon powder having a mean particle size of 4 μm and adding and kneading with 6 parts by weight of methyl cellulose as a molding assistant, 2.5 parts by weight of oleic acid as a dispersion medium and 24 parts by weight of water based on 100 parts by weight of the thus mixed powder.

(2) A porous ceramic member made of silicon-silicon carbide composite body having a porosity of 45%, a mean pore diameter of 10 μm and a size of 34.3 mm×34.3 mm×150 mm is prepared in the same manner as in Example 2.2 by using the raw material paste prepared in the item (1) except that in the steps of Example 1 (B) (3) and (4), the porous ceramic member is heated in an argon atmosphere at 1400° C. for 2 hours to melt monocrystal silicon to thereby bond silicon carbide particles with silicon, and thereafter firing in an argon atmosphere of a normal pressure at 2200° C. for 2 hours.

(3) Then, a cylindrical honeycomb structural body functioning as a honeycomb filter for purifying an exhaust gas is prepared by substantially the same treatments as in Example 1 (B) (5)-(8) as Example 5.1.

A porous ceramic member made of silicon-silicon carbide composite body having a porosity of 45%, a mean pore diameter of 10 μm and a size of 34.3 mm×34.3 mm×150 mm is prepared by the same treatment as in Example 5.1 except that the porous ceramic member is heated in an argon atmosphere at 1400° C. for 2 hours to melt monocrystal silicon to thereby bond silicon carbide particles with silicon and thereafter fired in an argon atmosphere of a normal pressure at 2250° C. for 3 hours to conduct crystallization of silicon, and an assembly type ceramic structural body is prepared by bundling a plurality of these members as Example 5.2.

A porous ceramic member made of silicon-silicon carbide composite body having a porosity of 45%, a mean pore diameter of 10 μm and a size of 34.3 mm×34.3 mm×150 mm is prepared by the same treatment as in Example 5.1 except that the porous ceramic member is heated in an argon atmosphere at 1400° C. for 2 hours to melt monocrystal silicon to thereby bond silicon carbide particles with silicon, and thereafter fired in an argon atmosphere of a normal pressure at 2200° C. for 2 hours to conduct crystallization of silicon, and an assembly type ceramic structural body is prepared by bundling a plurality of these members as Example 5.3.

Further, a porous ceramic member made of silicon-silicon carbide composite body having a porosity of 45%, a mean pore diameter of 10 m and a size of 34.3 mm×34.3 mm×150 mm is prepared by the same treatment as in Example 5.1 except that the porous ceramic member is heated in an argon atmosphere at 1400° C. for 2 hours to melt monocrystal silicon to thereby bond silicon carbide particles with silicon, and thereafter fired in an argon atmosphere of a normal pressure at 2200° C. for 3 hours to conduct crystallization of silicon, and an assembly type ceramic structural body is prepared by bundling a plurality of these members as Example 5.4.

A porous ceramic member made of silicon-silicon carbide composite body having a porosity of 45%, a mean pore diameter of 10 μm and a size of 34.3 mm×34.3 mm×150 mm is prepared by the same treatment as in Example 5.1 except that amorphous silicon powder having a mean particle size of 4 μm is used as silicon powder and the porous ceramic member is heated in an argon atmosphere at 1400° C. for 2 hours to melt amorphous silicon to thereby bond silicon carbide particles with silicon and thereafter fired in an argon atmosphere of a normal pressure at 1600° C. for 3 hours to conduct crystallization of silicon, and an assembly type ceramic structural body is prepared by bundling a plurality of these members as Example 5.5.

A porous ceramic member made of silicon-silicon carbide composite body having a porosity of 45%, a mean pore diameter of 10 μm and a size of 34.3 mm×34.3 mm×150 mm is prepared by the same treatment as in Example 5.5 except that the porous ceramic member is heated in an argon atmosphere at 1400° C. for 2 hours to melt amorphous silicon to thereby bond silicon carbide particles with silicon and thereafter fired in an argon atmosphere of a normal pressure at 1500° C. for 2 hours to conduct crystallization of silicon, and an assembly type ceramic structural body is prepared by bundling a plurality of these members as Example 5.6.

A porous ceramic member made of silicon-silicon carbide composite body having a porosity of 45%, a mean pore diameter of 10 μm and a size of 34.3 mm×34.3 mm×150 mm is prepared by the same treatment as in Example 5.1 except that metal silicon powder having a mean particle size of 4 μm is used as silicon particles, and the porous ceramic member is heated in an argon atmosphere at 1400° C. for 2 hours to melt metal silicon to thereby bond silicon carbide particles with silicon and thereafter fired in an argon atmosphere of a normal pressure at 1600° C. for 3 hours to conduct crystallization of silicon, and an assembly type ceramic structural body is prepared by bundling a plurality of these members as Example 5.7.

A porous ceramic member made of silicon-silicon carbide composite body having a porosity of 45%, a mean pore diameter of 10 μm and a size of 34.3 mm×34.3 mm×150 mm is prepared by the same treatment as in Example 5.7 except that the porous ceramic member is heated in an argon atmosphere at 1400° C. for 2 hours to melt metal silicon to thereby bond silicon carbide particles with silicon and thereafter fired in an argon atmosphere of a normal pressure at 1500° C. for 2 hours to conduct crystallization of silicon, and an assembly type ceramic structural body is prepared by bundling a plurality of these members as Example 5.8.

With respect to Examples 5.1-5.8, the tests (A), (B) for resistance to thermal shock and the ash catching test (C) are conducted in the same manner as in Example 1, while in order to evaluate crystallinity of silicon for bonding silicon carbide particles constituting each porous ceramic member, a sample is pulverized into powder to measure a half-width value of Si peak ($2\theta$=about 28°) in X-ray diffraction.

As the X-ray diffracting device used for this analytical measurement is used Rigaku RINT-2500 made by Rigaku Denki Co., Ltd. A light source of X-ray diffraction is CuKα1, and as a measuring method, the sample is first pulverized and homogenized to fill in a sample holder made of glass, and then the sample holder filled with the sample is set on a sample mount of a goniometer, and thereafter a power source of the device is on to gradually increase voltage to 40 KV while flowing a cooling water into an X-ray tube, and a knob is tuned to set a current to 30 mA. Thereafter, the measurement is carried out under the following measuring conditions.

The measuring conditions are divergence slit: 0.5°, divergence vertical limit slit: 10 mm, scattering slit: 0.5°, light-intercepting slit: 0.3 mm, monochrome light-intercepting slit: 0.8 mm, operation mode: continuation, operation rate: 5.000°/min, step: 0.01°, scanning range: 10.000°-60.000°, monochrometer: use of count monochrometer, and optical system: centralized optical system.

The results are shown in Table 5.

TABLE 5

|  | Powder A (m.p.s: mean particle size) | Powder B (m.p.s.: mean particle size) | Molding assistant | Dispersion medium (unit:parts by weight) | Firing condition | Fired body | Thermal shock test (° C.) | Catching limit (g/L) | Accumulated amount ratio of ash |
|---|---|---|---|---|---|---|---|---|---|
| Example 5.1 | α-SiC m.p.s.= 30 μm 80 wt % | mono-crystal-Si m.p.s. = 4 μm 20 wt % | methyl cellulose | oleic acid 2.5 water 24 | 1400° C. 2 hours | mean pore size 10 μm porosity 45% | 70 | 10.5 | 0.54 |
|  |  |  |  |  | 2150° C. 2 hours | half-width value = 0.6 |  |  |  |
|  | 100 wt parts |  | 6 wt parts | 26.5 |  |  |  |  |  |
| Example 5.2 | α-SiC m.p.s. = 30 μm 80 wt % | mono-crystal-Si m.p.s. = 4 μm 20 wt % | methyl cellulose | oleic acid 2.5 water 24 | 1400° C. 2 hours | mean pore size 10 μm porosity 45% | 69 | 10.5 | 0.5 |
|  |  |  |  |  | 2250° C. 3 hours | half-width value = 0.05 |  |  |  |
|  | 100 wt parts |  | 6 wt parts | 26.5 |  |  |  |  |  |
| Example 5.3 | α-SiC m.p.s. = 30 μm 80 wt % | mono-crystal-Si m.p.s. = 4 μm 20 wt % | methyl cellulose | oleic acid 2.5 water 24 | 1400° C. 2 hours | mean pore size 10 μm porosity 45% | 80 | 11 | 0.32 |
|  |  |  |  |  | 2200° C. | half-width value = 0.3 |  |  |  |

TABLE 5-continued

| | Powder A (m.p.s: mean particle size) | Powder B (m.p.s.: mean particle size) | Molding assistant | Dispersion medium (unit:parts by weight) | Firing condition | Fired body | Thermal shock test (° C.) | Catching limit (g/L) | Accumulated amount ratio of ash |
|---|---|---|---|---|---|---|---|---|---|
| Example 5.4 | α-SiC<br>m.p.s. = 30 μm<br>80 wt % | 100 wt parts<br>mono-crystal-Si<br>m.p.s. = 4 μm<br>20 wt % | 6 wt parts methyl cellulose | 26.5<br>oleic acid 2.5<br>water 24 | 2 hours<br>1400° C.<br>2 hours<br>2200° C. | mean pore size 10 μm<br>porosity 45%<br>half-width value = 0.1 | 70 | 10.7 | 0.48 |
| Example 5.5 | α-SiC<br>m.p.s. = 30 μm<br>80 wt % | 100 wt parts<br>amor-phous-Si<br>m.p.s. = 4 μm<br>20 wt % | 6 wt parts methyl cellulose | 26.5<br>oleic acid 2.5<br>water 24 | 3 hours<br>1400° C.<br>2 hours<br>1600° C. | mean pore size 10 μm<br>porosity 45%<br>half-width value = 0.7 | 68 | 10 | 0.62 |
| Example 5.6 | α-SiC<br>m.p.s. = 30 μm<br>80 wt % | 100 wt parts<br>amor-phous-Si<br>m.p.s. = 4 μm<br>20 wt % | 6 wt parts methyl cellulose | 26.5<br>oleic acid 2.5<br>water 24 | 3 hours<br>1400° C.<br>2 hours<br>1500° C. | mean pore size 10 μm<br>porosity 45%<br>half-width value = 0.8 | 63 | 9.5 | 0.69 |
| Example 5.7 | α-SiC<br>m.p.s. = 30 μm<br>80 wt % | 100 wt parts<br>metal-Si<br>m.p.s. = 4 μm<br>20 wt % | 6 wt parts methyl cellulose | 26.5<br>oleic acid 2.5<br>water 24 | 2 hours<br>1400° C.<br>2 hours<br>1600° C. | mean pore size 10 μm<br>porosity 45%<br>half-width value = 0.75 | 65 | 9.8 | 0.65 |
| Example 5.8 | α-SiC<br>m.p.s. = 30 μm<br>80 wt % | α-SiC<br>metal-Si<br>m.p.s. = 4 μm<br>20 wt % | 6 wt parts methyl cellulose<br>6 wt parts | 26.5<br>oleic acid 2.5<br>water 24<br>26.5 | 3 hour<br>1400° C.<br>2 hours<br>1500° C.<br>2 hours | mean pore size 10 μm<br>porosity 45%<br>half-width value = 0.85 | 60 | 9.3 | 0.7 |
| | 100 wt parts | | | | | | | | |

As seen from the results shown in Table 5, when the porous ceramic member is made from silicon-silicon carbide compound body formed by bonding silicon carbide particles as ceramics with silicon and the honeycomb structural body made of the porous ceramic member is used as a filter, it is confirmed that in the examples wherein the half-width value of silicon peak in X-ray diffraction of the porous ceramic member exceeds 0.6°, the ash peeling is worse, and the ash is accumulated on the wall portion near the central portion from the exhaust side of the filter.

That is, it is confirmed that when the half-width value of silicon peak in X-ray diffraction is not more than 0.6°, the ash peeling is favorable, and the ash is much accumulated on the wall portion near the exhaust side of the filter.

Particularly, as silicon for bonding silicon carbide particles as ceramics, it is confirmed that the use of monorystal silicon (Examples 5.1-5.4) shows more excellent effects than the use of amorphous silicon (Examples 5.5-5.6) and metal silicon (Examples 5.7-5.8) in all points of test for resistance to thermal shock, catching limit and ash accumulated amount ratio.

Figure 9:
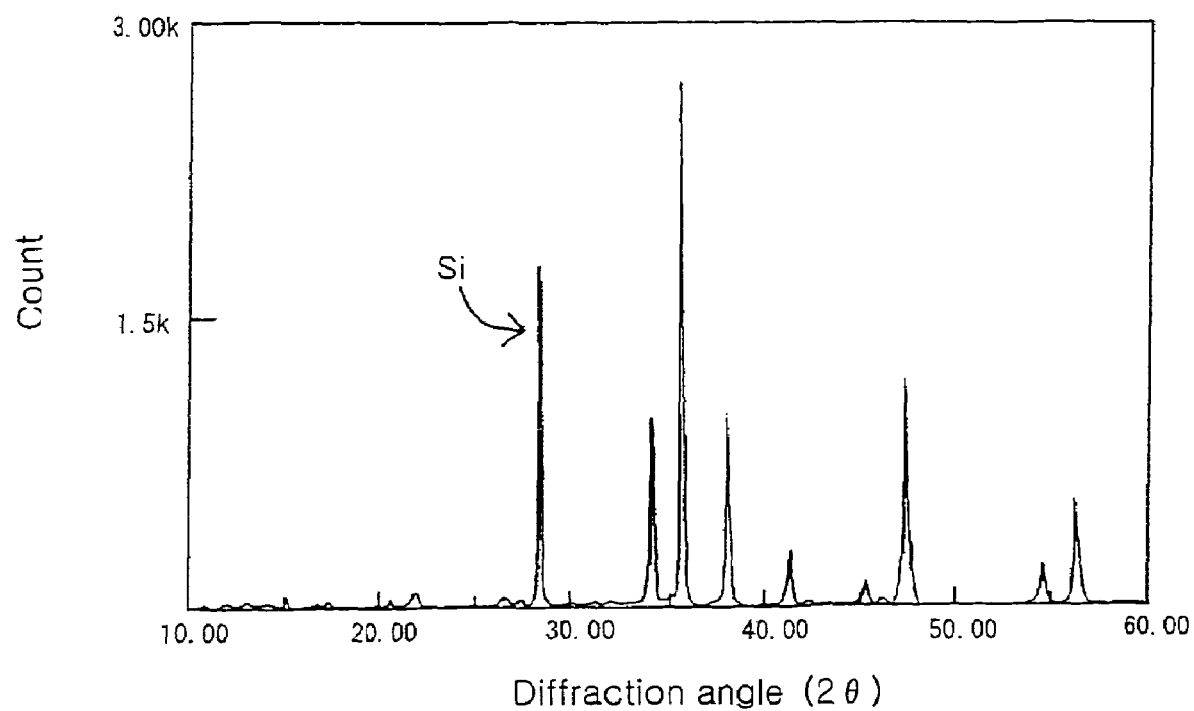
FIG. 9 is a graph showing an X-ray diffraction of the honeycomb filter of Comparative Example 5.1.

Moreover, FIG. 9 shows an X-ray diffraction graph of the honeycomb structural body according to Example 5.1. This shows that the half-width value of Si peak (2θ=about 28°) in the X-ray diffraction graph is 0.6°.

INDUSTRIAL APPLICABILITY

As explained above, since the honeycomb structural body of the invention is made of a silicon-ceramic composite body consisting of ceramics and silicon, the thermal dispersibility of the honeycomb structural body is improved, and even if uneven temperature distribution is generated or cold cycle is repeated in such a honeycomb structural body, thermal stress is not much accumulated, so that there is generated no crack or the like, and the resistance to thermal shock becomes excellent. In addition, in case of using as a filter for purifying an exhaust gas, an ability of ash peeling removal is improved.

The invention claimed is:

1. A honeycomb structural body comprising:
at least one pillar-shaped porous ceramic member comprising a silicon-ceramic composite material, the silicon-ceramic composite material comprising a silicon constituent and a ceramic constituent, the at least one pillar-shaped porous ceramic member having a plurality of through-holes extending in a longitudinal direction of the at least one pillar-shaped porous ceramic member and a plurality of partitions separating the through-holes, wherein the through-holes are plugged such that an opening area at one end face of the at least one pillar-shaped porous ceramic member is different from an opening area at the other end face of the at least one pillar-shaped porous ceramic member, and a surface roughness of the partition in the porous ceramic member is 1.0-30.0 μm.

2. A honeycomb structural body according to claim 1, wherein the plurality of through-holes include a group of large volume through-holes plugged so as to make relatively large a sum of opening areas at the one end face which is perpendicular to the longitudinal direction, and a group of small volume through-holes plugged so as to make relatively small a sum of opening areas at the other end face.

3. A honeycomb structural body according to claim 1, wherein the silicon constituent is interposed among the ceramic constituent.

4. A honeycomb structural body comprising:

at least one pillar-shaped porous ceramic member comprising a silicon-ceramic composite material, the silicon-ceramic composite material comprising a silicon constituent and a ceramic constituent, the at least one pillar-shaped porous ceramic member having a plurality of through-holes extending in a longitudinal direction of the at least one pillar-shaped porous ceramic member and a plurality of partitions separating the through-holes, wherein the plurality of through-holes includes a group of large volume through-holes plugged so as to make relatively large a sum of opening areas at one end perpendicular to the longitudinal direction, and a group of small volume through-holes plugged so as to make relatively small a sum of opening areas at the other end face, and a surface roughness of the partition in the porous ceramic member is 1.0-30.0 μm.

5. A honeycomb structural body according to claim 4, wherein the plurality of through-holes has a relation that a distance between gravity centers of the large volume through-holes perpendicular to the longitudinal direction is equal to a distance between gravity centers of the small volume through-holes which are perpendicular to the longitudinal direction.

6. A honeycomb structural body according to claim 4, wherein each of the large volume through-holes is made of a through-hole having a hole size larger than a hole size of each of the small volume through-holes.

7. A honeycomb structural body according to claim 4, wherein the large volume through-holes comprise a gas inflow side cells opened at an inlet side, and the small volume through-holes comprise a gas outflow side cells opened at an outlet side.

8. A honeycomb structural body according to claim 4, wherein the pillar-shaped porous ceramic member has a porosity in a range of 30-80%.

9. A honeycomb structural body according to claim 4, wherein the plurality of partitions have a thickness in a range of 0.15-0.45 mm.

10. A honeycomb structural body according to claim 4, wherein a half-width value of Si peak ($2\theta$= about 28°) in an X-ray diffraction of the silicon-ceramic composite material is not more than 0.6°.

11. A honeycomb structural body according to claim 4, wherein the plurality of through-holes are plugged with a plugging material.

12. A honeycomb structural body according to claim 4, wherein each of the plurality of through-holes has a polygonal shape.

13. A honeycomb structural body according to claim 4, wherein through-holes have at least one of a square shape and an octagonal shape.

14. A honeycomb structural body according to claim 4, wherein each of the through-holes has at least one corner part which has a round or chamfered form.

15. A honeycomb structural body according to claim 4, wherein an area ratio of each of the large volume through-holes perpendicular to the longitudinal direction to each of the small volume through-holes perpendicular to the longitudinal direction (large volume through-hole sectional area/ small volume through-hole sectional area) is 1.01-9.00.

16. A honeycomb structural body according to claim 4, wherein an area ratio of each of the large volume through-holes perpendicular to the longitudinal direction to each of the small volume through-holes perpendicular to the longitudinal direction (large volume through-hole sectional area/ small volume through-hole sectional area) is 1.01-6.00.

17. A honeycomb structural body according to claim 4, further comprising a catalyst coated over at least part of the partitions.

18. A honeycomb structural body according to claim 4, wherein the at least one pillar-shaped porous ceramic member comprises a plurality of pillar shaped porous ceramic members bundled through a sealing material layer.

19. A honeycomb structural body according to claim 4, wherein the ceramic constituent comprises silicon carbide.

20. A filter for purifying an exhaust gas, comprising the honeycomb structural body according to claim 4.

21. A honeycomb structural body according to claim 4, wherein the silicon constituent is interposed among the ceramic constituent.

* * * * *